US008733917B2

(12) United States Patent
Mataki

(10) Patent No.: US 8,733,917 B2
(45) Date of Patent: May 27, 2014

(54) LINE IMAGE FORMING METHOD AND APPARATUS

(75) Inventor: Hiroshi Mataki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 229 days.

(21) Appl. No.: 13/067,999

(22) Filed: Jul. 14, 2011

(65) Prior Publication Data

US 2012/0026225 A1 Feb. 2, 2012

(30) Foreign Application Priority Data

Jul. 15, 2010 (JP) ................................ 2010-160848

(51) Int. Cl.
*B41J 29/38* (2006.01)
*G01D 11/00* (2006.01)

(52) U.S. Cl.
USPC .............................................. 347/100; 347/9

(58) Field of Classification Search
USPC ..................................................... 347/100, 9
See application file for complete search history.

(56) References Cited

U.S. PATENT DOCUMENTS

| | | | | |
|---|---|---|---|---|
| 7,709,291 | B2 * | 5/2010 | Nakagawa | 438/99 |
| 2009/0104380 | A1 * | 4/2009 | Ueda et al. | 428/1.54 |
| 2009/0214789 | A1 * | 8/2009 | Tomioka et al. | 427/256 |
| 2010/0073413 | A1 | 3/2010 | Mataki | |

FOREIGN PATENT DOCUMENTS

| | | | |
|---|---|---|---|
| JP | 2008076693 | A | 4/2008 |
| JP | 2008159719 | A | 7/2008 |
| JP | 2008-294308 | | 12/2008 |
| JP | 2010075786 | A * | 4/2010 |
| JP | 2010075786 | A | 4/2010 |

OTHER PUBLICATIONS

Notification of Reasons for Rejection issued by Japanese Patent Office on Jul. 25, 2013 in connection with JP2010-160848.

* cited by examiner

*Primary Examiner* — Jason Uhlenhake
(74) *Attorney, Agent, or Firm* — Jean C. Edwards, Esq.; Edwards Neils PLLC

(57) ABSTRACT

A line image forming method includes the steps of: ejecting a plurality of droplets of liquid sequentially from an inkjet head, the liquid containing a functional component; and depositing the droplets of the liquid onto a non-permeable medium, the deposited droplets becoming joined together on the non-permeable medium to form a line pattern of the liquid, wherein a receding contact angle of the liquid with respect to the non-permeable medium being not larger than 10°.

14 Claims, 18 Drawing Sheets

| | STATIC CONTACT ANGLE | RECEDING CONTACT ANGLE | SHAPE |
|---|---|---|---|
| COMPARATIVE EXAMPLE 1 | 25° | 16° |  |
| COMPARATIVE EXAMPLE 2 | 15° | 11° |  |
| PRACTICAL EXAMPLE 1 | 29° | 9° |  |
| PRACTICAL EXAMPLE 2 | 16° | 7° |  |

| | STATIC CONTACT ANGLE | SHAPE |
|---|---|---|
| PRACTICAL EXAMPLE 1 | 29° |  |
| PRACTICAL EXAMPLE 2 | 16° |  |
| COMPARATIVE EXAMPLE 3 | 5° |  |

LINE IMAGE FORMING METHOD AND APPARATUS

CROSS-REFERENCE TO RELATED APPLICATIONS

The present invention claims priority from Japanese Patent Application No. 2010-160848, filed on Jul. 15, 2010, the contents of which are herein incorporated by reference in their entirety.

BACKGROUND OF THE INVENTION

1. Field of the Invention

The present invention relates to a line image forming method and a line image forming apparatus, and more particularly to line image formation technology suitable for forming a line pattern on a surface of a non-permeable medium using an inkjet head.

2. Description of the Related Art

Japanese Patent Application Publication No. 2008-294308 discloses technology for forming a desired conductive pattern (circuit pattern) by applying a metallic nano-ink onto a polyimide film by inkjet printing. According to Japanese Patent Application Publication No. 2008-294308, by making the contact angle of the metallic nano-ink with respect to the polyimide film 10° or greater, bleeding of the metallic nano-ink after application is suppressed, and improvement in the accuracy of the pattern dimensions is achieved.

In Japanese Patent Application Publication No. 2008-294308, a metallic nano-ink droplet is dripped onto a polyimide varnish layer, the contact angle of the droplet on the surface is measured (paragraph 0034 in Japanese Patent Application Publication No. 2008-294308), and conditions relating to the static contact angle are stipulated. On the other hand, as shown in FIG. 9, it was confirmed in the experimentation performed by the present inventor that when carrying out straight line image formation by depositing droplets on a surface with an inkjet system and if the receding contact angle of the droplets on the surface was high, a line shape was not formed and an aggregate of dots was obtained.

Japanese Patent Application Publication No. 2008-294308 specifies the conditions relating to the static contact angle, but does not make any mention of the receding contact angle. Consequently, when image formation is carried out as described in Japanese Patent Application Publication No. 2008-294308, a satisfactory line shape is not obtained under certain conditions, resulting in a plurality of dots.

SUMMARY OF THE INVENTION

The present invention has been contrived in view of these circumstances, an object thereof being to provide a line image forming method and a line image forming apparatus capable of forming a uniform line shape while avoiding the occurrence of dot shapes when forming an image of a line pattern.

In order to attain the aforementioned object, the present invention is directed to a line image forming method, comprising the steps of: ejecting a plurality of droplets of liquid sequentially from an inkjet head, the liquid containing a functional component; and depositing the droplets of the liquid onto a non-permeable medium, the deposited droplets becoming joined together on the non-permeable medium to form a line pattern of the liquid, wherein a receding contact angle of the liquid with respect to the non-permeable medium being not larger than 10°.

According to this aspect of the present invention, the droplets which have been sequentially deposited onto the non-permeable medium combine together on the non-permeable medium, and the shape after image formation is a single line shape. Consequently, it is possible to prevent the results of image formation of a line pattern from becoming a plurality of dot shapes.

Preferably, a static contact angle of the liquid with respect to the non-permeable medium is not smaller than 10°.

According to this aspect of the present invention, it is possible to form a stable image of a line shape having uniform line width.

Preferably, in the depositing step, a dot pitch p (μm) of the deposited droplets which are adjacent to each other on the non-permeable medium is controlled to satisfy:

$$p \leq \frac{\pi d}{6\left(\frac{\theta}{\sin^2\theta} - \frac{\cos\theta}{\sin\theta}\right)\left\{\tan\frac{\theta}{2}\left(3 + \tan^2\frac{\theta}{2}\right)\right\}^{-\frac{2}{3}}},$$

where d (μm) is a droplet diameter obtained by spherical conversion of a volume of each of the droplets before being deposited on the non-permeable medium, and θ (rad) is a static contact angle of the liquid with respect to the non-permeable medium.

By performing droplet ejection which satisfies these conditions, it is possible to suppress the occurrence of jaggedness.

Preferably, in the ejecting step, an ejection frequency of the inkjet head is not lower than 1 kHz.

According to this aspect of the present invention, it is possible to prevent the occurrence of periodic bulges.

Preferably, the liquid is configured to be cured by irradiation of an activating light beam; in the ejecting step, the inkjet head is controlled in such a manner that a subsequent droplet to be combined with an aggregate of a group of droplets having been previously deposited on the non-permeable medium is deposited onto the non-permeable medium before the aggregate of the group of previously deposited droplets reaches a state of equilibrium on the non-permeable medium; and the line image forming method further comprises the step of curing the liquid deposited on the non-permeable medium by irradiating the activating light beam onto the liquid on the non-permeable medium.

As the activating light beam, it is possible to use ultraviolet light, visible light, infrared light, or a suitable combination of these.

Preferably, in the curing step, a time T (s) from depositing of a last deposited droplet forming the line pattern until curing of the line pattern is controlled to satisfy:

$$T \leq \left(\frac{\pi}{6\theta}\right)^3,$$

where θ (rad) is a static contact angle of the liquid with respect to the non-permeable medium.

According to this aspect of the present invention, the group of droplets sequentially deposited on the non-permeable medium join together and eventually reach a state of equilibrium, forming a line pattern. In this case, by depositing a subsequent droplet to combine with an aggregate of a group of previously deposited droplets, before this aggregate of droplets has wet and spread completely (before the droplets have reached a state of equilibrium), it is possible to suppress the occurrence of jaggedness. Furthermore, since a curing process is carried out within a short time after droplet ejection to form a line pattern, then the occurrence of random bulges can be suppressed. In this way, according to this aspect of the present invention, the occurrence of bulges and jaggedness is prevented and a line segment of uniform width can be formed.

From experimental findings, when an aggregate (mass) composed of a group of deposited droplets which have combined in a line shape on the medium are left for a long period of time, a portion of the line shape swells and this swelling gradually develops due to the pressure difference caused by surface tension and ultimately forms a large bulge. In relation to this phenomenon, the time taken for a portion of the line-shape to start swelling after image formation is inversely proportional to the cube of the contact angle, and is approximately one second when the contact angle is 30° (π/6 (rad)). Therefore, desirably, if the contact angle is 30° (π/6 (rad)), then curing is performed within one second after image formation.

Preferably, the liquid contains volatile solvent.

By imparting volatility to the liquid, it is possible to prevent the occurrence of random bulges.

In order to attain the aforementioned object, the present invention is also directed to a line image forming apparatus, comprising: an inkjet head which ejects a plurality of droplets of liquid containing a functional component; a movement device which causes the inkjet head and a non-permeable medium to move relatively to each other, the droplets of the liquid ejected from the inkjet head being deposited onto the non-permeable medium; and a control device which controls the inkjet head and the movement device to form a line pattern of the liquid on the non-permeable medium by ejecting the droplets sequentially from the inkjet head and depositing the droplets onto the non-permeable medium, the deposited droplets having deposition time differences and becoming joined together on the non-permeable medium to form the line pattern of the liquid, wherein a receding contact angle of the liquid with respect to the non-permeable medium being not larger than 10°.

Preferably, the control device controls the inkjet head to eject the droplets at an ejection frequency of not lower than 1 kHz.

Preferably, the liquid is configured to be cured by irradiation of an activating light beam; the line image forming apparatus further comprises an activating light irradiation device which irradiates the activating light beam onto the liquid deposited on the non-permeable medium to cure the liquid on the non-permeable medium; the control device controls the inkjet head in such a manner that a subsequent droplet to be combined with an aggregate of a group of droplets having been previously deposited on the non-permeable medium is deposited onto the non-permeable medium before the aggregate of the group of previously deposited droplets reaches a state of equilibrium on the non-permeable medium; and the control device controls the activating light irradiation device in such a manner that a time T (s) from depositing of a last deposited droplet forming the line pattern until curing of the line pattern satisfies:

$$T \leq \left(\frac{\pi}{6\theta}\right)^3,$$

where θ (rad) is a static contact angle of the liquid with respect to the non-permeable medium.

Preferably, the control device controls the inkjet head in such a manner that a deposition time interval t (s) of the droplets adjacent to each other on the non-permeable medium satisfies:

$$t \leq \left(\frac{\pi}{6\theta}\right)^3 \times 0.001.$$

Based on experimental findings, the time taken until the deposited droplets reach a state of equilibrium is inversely proportional to the cube of the contact angle, and if the static contact angle is 30° (π/6 (rad)), then desirably, the deposition time difference (droplet ejection time interval) between mutually adjacent pixels is not longer than 1 ms.

Preferably, the movement device includes a medium conveyance device which conveys the non-permeable medium in a medium conveyance direction at a uniform speed; and the activating light irradiation device is arranged on a downstream side of the inkjet head in terms of the medium conveyance direction.

According to this aspect of the present invention, a medium which has undergone image formation by the inkjet head is conveyed to the position of the activating light irradiation device by the medium conveyance device and is subjected to a curing process.

It is also preferable that the activating light irradiation device is attached to the inkjet head, and the inkjet head and the activating light irradiation device are unitedly moved relatively with respect to the non-permeable medium.

According to this aspect of the present invention, it is possible to irradiate activating light immediately after image formation by the inkjet head. Furthermore, since laser light has good linearity and light is not liable to enter into the nozzles of the inkjet head, then it is desirable to irradiate laser light from the activating light irradiation device in a mode where the activating light irradiation device is arranged in close proximity to the inkjet head.

According to the present invention, it is possible to prevent the image formed as a line pattern from assuming a plurality of dot shapes, and a satisfactory line shape can be formed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

First Embodiment

<Composition of Line Image Forming Apparatus>

Figure 1:
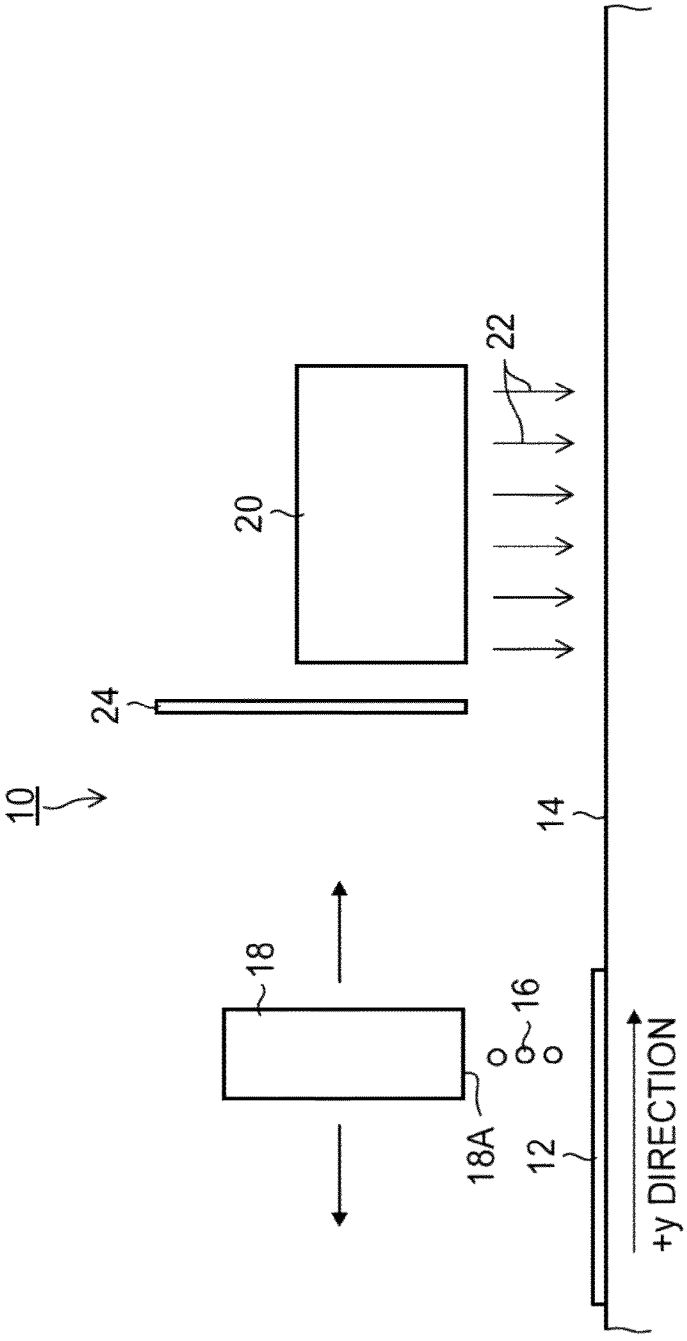
FIG. 1 is a side view diagram showing the composition of a line image forming apparatus according to a first embodiment of the present invention.
Figure 2:
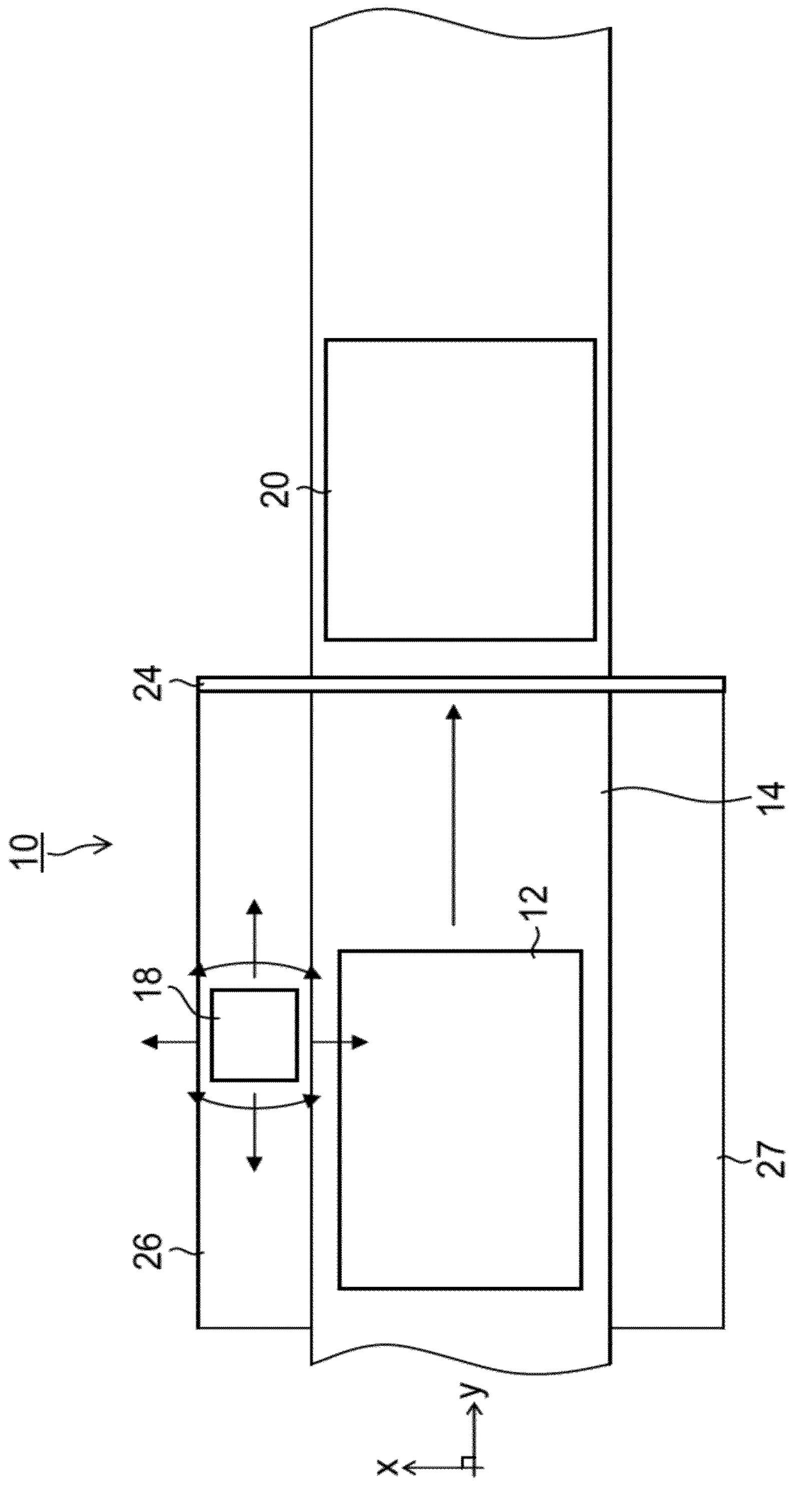
FIG. 2 is a plan view diagram of the line image forming apparatus shown in FIG. 1.

FIG. 1 is a side view of a line image forming apparatus according to a first embodiment of the present invention, and FIG. 2 is a plan view of same. As shown in FIGS. 1 and 2, the line image forming apparatus 10 in the present embodiment includes: a belt 14 (corresponding to a "movement device" and a "medium conveyance device"), which conveys a substrate 12 (corresponding to a "non-permeable medium"); an inkjet head 18 (hereinafter referred to as "recording head"), which ejects a functional liquid 16 (here, a liquid having an action of being cured by ultraviolet light, called "UV ink" for the sake of convenience) toward the substrate 12, and a UV light irradiation device 20 (corresponding to an "activating light irradiation device").

The substrate 12 is an image formation medium on which the UV ink 16 ejected from the recording head 18 is deposited. For the substrate 12, a non-permeable medium (e.g., made of resin), or a low-permeability medium having a sufficiently long permeation time is used. In the present specification, such media are referred to jointly as a "non-permeable medium". For example, for the substrate 12, various materials, such as polyimide, PET (polyethylene terephthalate), glass epoxy, silicon, glass, metal, or the like may be used.

The belt 14 is an endless belt which is wrapped between rollers (not shown), and is driven by a motor (not shown). The substrate 12 held on the belt 14 is conveyed in the rightward direction in FIGS. 1 and 2 (+y direction; sub-scanning direction). During image formation, the conveyance speed of the substrate 12 is controlled to a uniform speed. In the present embodiment, the belt 14 is used as a conveyance device for the substrate 12, but the device for holding and conveying the substrate 12 is not limited to the belt 14. For example, it is possible to adopt a mode in which the substrate 12 is mounted on a flat plate and the substrate 12 is moved together with the plate, or a mode where, if the substrate 12 is flexible, the substrate 12 is wrapped about the circumferential surface of a drum and the substrate 12 is moved by rotating the drum, or the like.

The UV ink 16 is not limited to colored ink which is suited to graphic printing applications, and various modes are possible, such as a resist ink (heat-resistant coating material) for printed wiring, a liquid dispersion formed by conductive micro-particles dispersed in a dispersion medium, an ink used for manufacturing a color filter, or the like.

The recording head 18 is supported movably in a direction (x axis direction; main scanning direction) which is perpendicular to the conveyance direction (+y direction) of the substrate 12 and in a direction (y axis direction) which is parallel to the conveyance direction of the substrate 12, in a plane parallel to the surface of the substrate 12. The detailed composition of the drive mechanism for moving the recording head 18 (an x direction movement device and a direction movement device) is not depicted, but a commonly known device, such as ball screws, linear rails, or the like, can be employed. By moving the recording head 18 simultaneously in the x axis direction and the y axis direction, the recording head 18 can be moved in any direction (including diagonal directions) within the xy plane.

Furthermore, it is also possible to provide a mechanism (turning device) which turns the recording head 18 in the xy plane or a mechanism (z direction movement device) which moves the recording head 18 in a normal direction (z axis direction) of the substrate 12.

During image formation, the position of the recording head 18 in the z direction is adjusted in such a manner that the clearance between the belt 14 and the recording head 18 (in other words, the clearance between the recording head 18 and the surface of the substrate 12 on the belt 14) is a prescribed distance, and the recording head 18 is made to perform a scanning action in the x axis direction and the y axis direction while maintaining this uniform clearance. By moving the recording head 18 in the +x and −x directions and the +y and −y directions, it is possible to change the image formation position on the substrate 12, and droplets can be deposited at any desired position in the image formation region of the substrate 12.

In the present embodiment, it is possible to form an image of a straight line in any direction on the surface of the substrate 12, by ejecting UV ink 16 from a nozzle (reference numeral 32 in FIG. 3) of the recording head 18, while conveying the substrate 12 at a uniform speed by means of the belt 14 and moving the recording head 18 in the x axis direction and the y axis direction.

The maximum value of the speed of the recording head 18 is set to the conveyance speed of the substrate 12, if moving in the same direction as the direction of conveyance of the substrate 12 (the +y direction in FIGS. 1 and 2). In other words, the recording head 18 can be moved in the +y direction at the conveyance speed of the substrate 12, at fastest.

The UV light irradiation device 20 is disposed on the downstream side of the recording head 18 in terms of the conveyance direction of the substrate 12. The substrate 12 on which droplet deposition (image formation) has been performed by the recording head 18 is conveyed in the y direction by belt conveyance, and is placed at the position of the UV light irradiation device 20. When the substrate 12 passes below the UV light irradiation device 20, ultraviolet light 22 is irradiated onto the image formation surface of the substrate 12 by means of the UV light irradiation device 20. By this means, the UV ink on the substrate 12 is cured (solidified).

The UV light irradiated from the UV light irradiation device 20 is reflected by the substrate 12, the belt 14, and the like, and when this reflected light reaches the ejection surface (nozzle surface) 18A of the recording head 18, the ink inside the nozzle is cured and can give rise to nozzle blockage (ejection failure). In order to resolve this problem, it is desirable to arrange a light shielding plate 24 (which corresponds to a "light shielding member") for shielding the recording head 18 from the UV light between the recording head 18 and the UV light irradiation device 20.

Furthermore, if the recording head 18 based on the inkjet method continues for a long period of time in a state of not ejecting ink, then the solvent of the ink in the nozzle evaporates, the ink increases in viscosity, and ejection defect or ejection failure occur. In order to resolve this problem, before starting image formation on the substrate 12 or during the course of image formation, it is desirable to carry out preliminary ejection (also called "purging", "blank ejection", "spit ejection", "dummy ejection") outside the image formation region. Therefore, in the line image forming apparatus 10, a desirable mode is one where preliminary ejection regions (also called a "purge zone") 26 and 27 are provided outside the image formation region.

From the viewpoint of shortening the time before performing preliminary ejection until starting image formation on the substrate 12, desirably, the preliminary ejection regions 26 and 27 are arranged in the vicinity of the image formation region. It is especially desirable to start printing onto the substrate 12 within one second after preliminary ejection, and therefore, a desirable mode is one where the preliminary ejection regions 26 and 27 are arranged at either side of the belt 14, as shown in FIG. 2. By means of this composition, before the start of image formation onto the substrate 12, or during image formation if necessary, the recording head 18 is moved to the preliminary ejection region 26 or 27, where preliminary ejection is performed.

Figure 3:
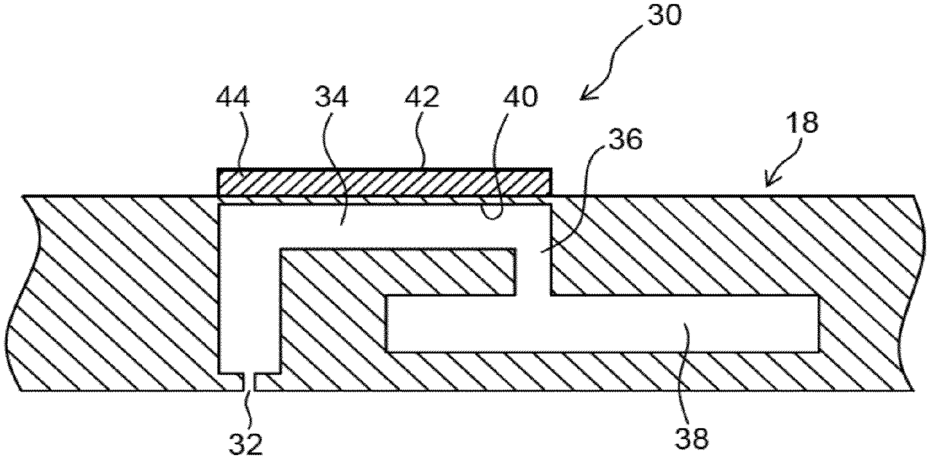
FIG. 3 is a cross-sectional diagram showing the inner composition of a droplet ejection element in a recording head.

FIG. 3 is a cross-sectional diagram showing the inner composition of a droplet ejection element 30 of one channel which is the unit of the recording element in the recording head 18 (namely, an ink chamber unit corresponding to one nozzle 32).

A pressure chambers 34 provided correspondingly to the nozzles 32 is connected to a common flow channel 38 through a supply port 36. The common flow channel 38 is connected to a tank (not shown) which forms a liquid supply source, and the liquid supplied from the tank is supplied to the pressure chamber 34 through the common flow channel 38.

A piezoelectric element 44 provided with an individual electrode 42 is bonded to a pressure plate 40 (a diaphragm that also serves as a common electrode) which forms the surface of one portion (in FIG. 3, the ceiling) of the pressure chamber 34. For the material of the piezoelectric element 44, it is possible to use a piezoelectric body, such as lead zirconate titanate (PZT) or barium titanate, for example.

When a drive signal is applied between the individual electrode 42 and the common electrode, the piezoelectric element 44 deforms and the volume of the pressure chamber 34 changes. This change in volume produces a pressure change, which causes the ink in the pressure chamber 34 to be ejected from the nozzle 32. When the displacement of the piezoelectric element 44 returns to its original state after ejecting ink, the pressure chamber 34 is replenished with new ink from the common flow channel 38 through the supply port 36.

In the present embodiment, the piezoelectric element 44 is employed as an ink ejection force generating device, but instead of an ejection method of this kind (a piezo-jet method), it is also possible to employ a thermal method in which a heater is arranged inside the pressure chamber 34 and ink is ejected due to the pressure of film boiling caused by heating by the heater.

Moreover, in implementing the present invention, there are no particular restrictions on the number and arrangement of the nozzles 32 in the recording head 18, and a composition with only one nozzle may be adopted, or a composition in which a plurality of nozzles are arranged one-dimensionally or two-dimensionally may be adopted.

Figure 4:
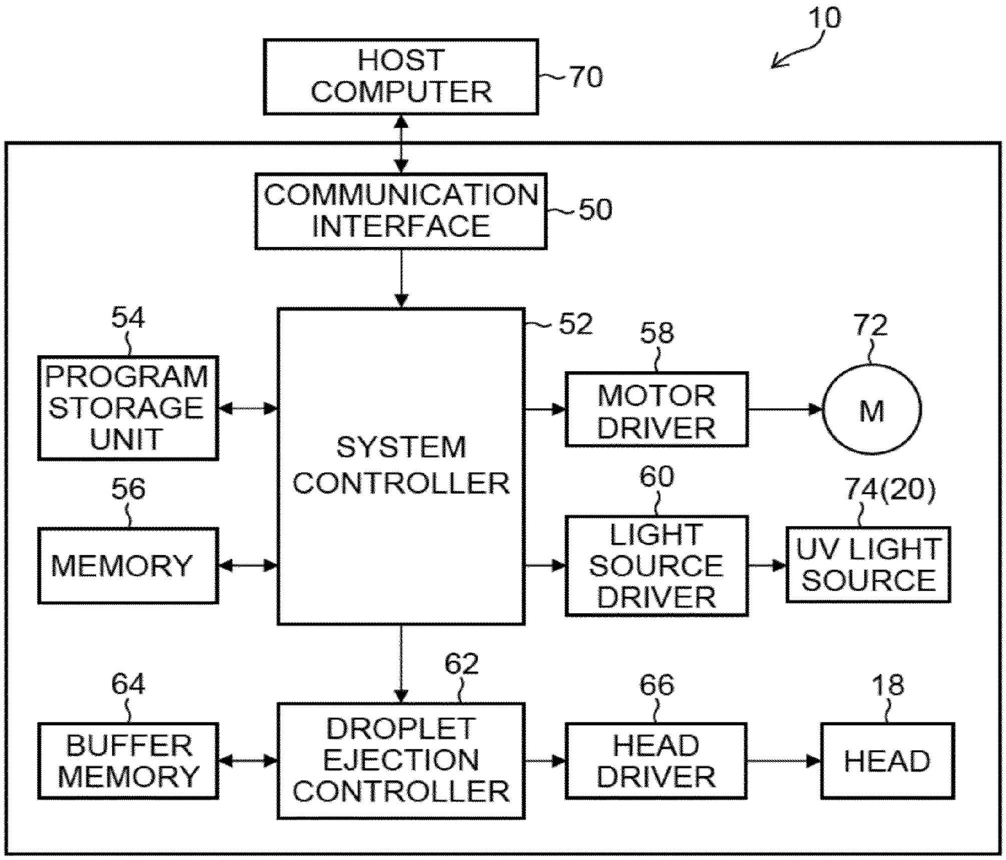
FIG. 4 is a block diagram showing a control system of the line image forming apparatus.

FIG. 4 is a block diagram showing a control system of the line image forming apparatus 10.

The line image forming apparatus 10 includes a communication interface 50, a system controller 52, a program storage unit 54, a memory 56, a motor driver 58, a UV light source driver 60, a droplet ejection controller 62, a buffer memory 64, and a head driver 66.

The communication interface 50 is an interface unit for receiving droplet ejection data transmitted by a host computer 70. For the communication interface 50, a serial interface, such as USB (Universal Serial Bus), IEEE 1394, Ethernet, a wireless network, or the like, or a parallel interface, such as a Centronics interface, or the like, can be used. In the communication interface 50, it is also possible to install a buffer memory for achieving high-speed communications.

The system controller 52 includes a central processing unit (CPU) and peripheral circuitry thereof, and forms a control unit for controlling the respective parts of the line image forming apparatus 10, as well as forming a calculation processing unit for carrying out various calculation processes. The system controller 52 controls communications with the host computer 70 and the reading and writing from and to the memory 56, and the like, as well as generating control signals which control the motor 72 of the conveyance drive system and the head moving system, and the light emission by the UV light source 74.

Various program and data required for controlling the line image forming apparatus 10 are stored in the program storage unit 54. The system controller 52 reads out various control programs stored in the program storage unit 54, as appropriate, and executes the programs.

The memory 56 is a storage device which includes a temporary storage area for data and a work area for the system controller 52 to carry out calculations. Apart from a memory constituted of semiconductor elements, it is also possible to use a magnetic medium, such as a hard disk, for the memory 56.

The motor 72 represents various motors arranged in the line image forming apparatus 10, and includes a motor which applies drive force to the drive mechanism of the belt 14 illustrated in FIGS. 1 and 2, as well as a motor which applies drive force to the movement mechanism of the recording head 18. The motor driver 58 drives the motor 72 in accordance with a control signal from the system controller 52.

The UV light source 74 is included in the UV light irradiation device 20 shown in FIGS. 1 and 2, and is constituted of an UV lamp, a laser diode, or the like. The light source driver 60 turns the UV light source 74 on and off, and adjusts the amount of emitted light, in accordance with a control signal from the system controller 52.

Droplet ejection data sent from the host computer 70 is read into the line image forming apparatus 10 through the communication interface 50, and is stored temporarily in the memory 56. The droplet ejection controller 62 is a control unit which has signal processing functions for carrying out processing, correction, and other treatments in order to generate an ejection control signal on the basis of the droplet ejection data in the memory 56, and which supplies the ejection control signal (ejection data) thus generated to the head driver 66, in accordance with control implemented by the system controller 52. In the droplet ejection controller 62, required signal processing is carried out and the liquid ejection volume and the ejection timing of the recording head 18 are controlled through the head driver 66 on the basis of the droplet ejection data.

The buffer memory 64 is provided in the droplet ejection controller 62, and data, such as droplet ejection data and parameters, is stored temporarily in the buffer memory 64 when processing the droplet ejection data in the droplet ejection controller 62. The memory 56 may also serve as the buffer memory 64. Also possible is a mode in which the droplet ejection controller 62 and the system controller 52 are integrated to form a single processor. A combination of the system controller 52 and the droplet ejection controller 62 according to the present embodiment corresponds to a "control device".

The head driver 66 drives the piezoelectric element 44 of the recording head 18 (see FIG. 3) on the basis of the ejection data which is supplied from the droplet ejection controller 62. The head driver 66 may also include a feedback control system for maintaining uniform drive conditions in the recording head 18.

Although not shown in the drawings, the line image forming apparatus 10 includes a supply system for supplying liquid to the recording head 18 and a maintenance unit which carries out maintenance (nozzle suctioning, nozzle surface wiping, or the like) of the recording head 18.

Method of Measuring Receding Contact Angle

In the embodiment of the present invention, a combination of a substrate and ink is used according to which the receding contact angle of the ink with respect to the surface of the substrate is not larger than 10°.

Figure 5:
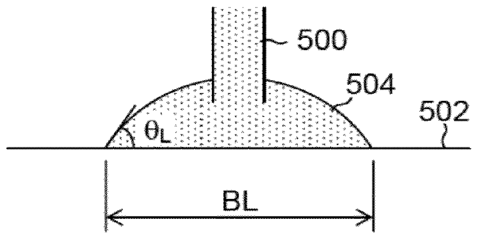
FIG. 5 is a schematic diagram for illustrating a method of measuring of an advancing contact angle and a receding contact angle.

FIG. 5 is a schematic diagram illustrating a method of measuring of an advancing contact angle and a receding contact angle. The method of measuring the dynamic contact angle employed in the present embodiment is called an expansion/contraction method. As shown in FIG. 5, the liquid is ejected from the tip of a hollow needle 500 connected with a syringe (not shown) to bring a droplet 504 of the liquid into contact with the substrate surface 502. The advancing contact angle and the receding contact angle are measured from the change in the contact angle of $\theta_L$ and the length of the contact line (base line) BL (i.e., contact surface diameter), when the droplet 504 in contact with the substrate surface 502 is being ejected and expanded, or drawn and reduced, by performing a squeezing action and a sucking action with the syringe.

The advancing contact angle is the contact angle when the interface of the droplet 504 with the substrate surface 502 is advancing, in other words, the contact angle when the liquid advances or spreads in a direction to a part that has not yet been wet with the liquid. The receding contact angle is the contact angle when the interface of the droplet 504 with the substrate surface 502 is receding, in other words, the contact angle when the liquid recedes or contracts in a direction to a part that has already been wet with the liquid.

Figure 6:
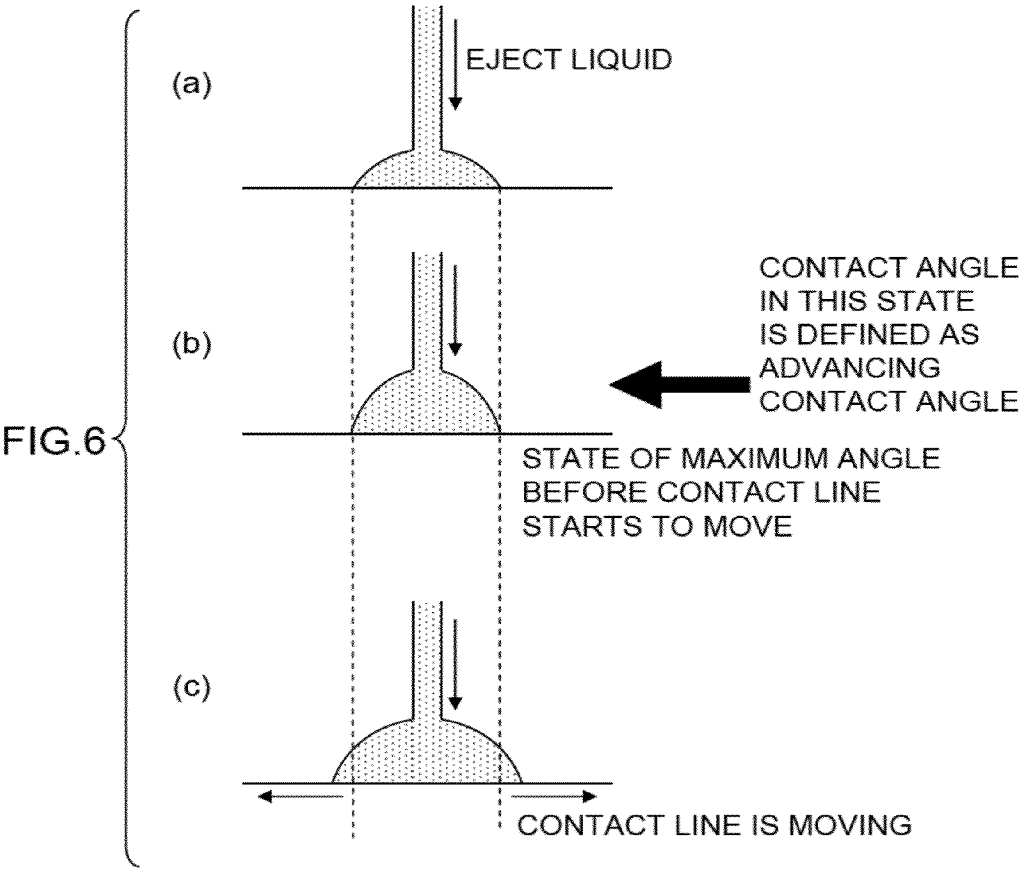
FIG. 6 is an illustrative diagram showing a state of measuring the advancing contact angle.

FIG. 6 is an illustrative diagram showing a state of measuring the advancing contact angle. As shown in FIG. 6, when the liquid starts to be ejected from the syringe, the volume of the droplet increases while the contact line (base line) is maintained for some time (the states (a) and (b) in FIG. 6), and the contact angle becomes gradually larger. As further liquid is continuously ejected, the base line stars to move and the contact surface area becomes larger (the state (c) in FIG. 6). The "advancing contact angle" is defined as the contact angle in the state (b) in FIG. 6 of the maximum angle (contact angle) where the base line has not moved from the state (a) in FIG. 6.

Figure 7:
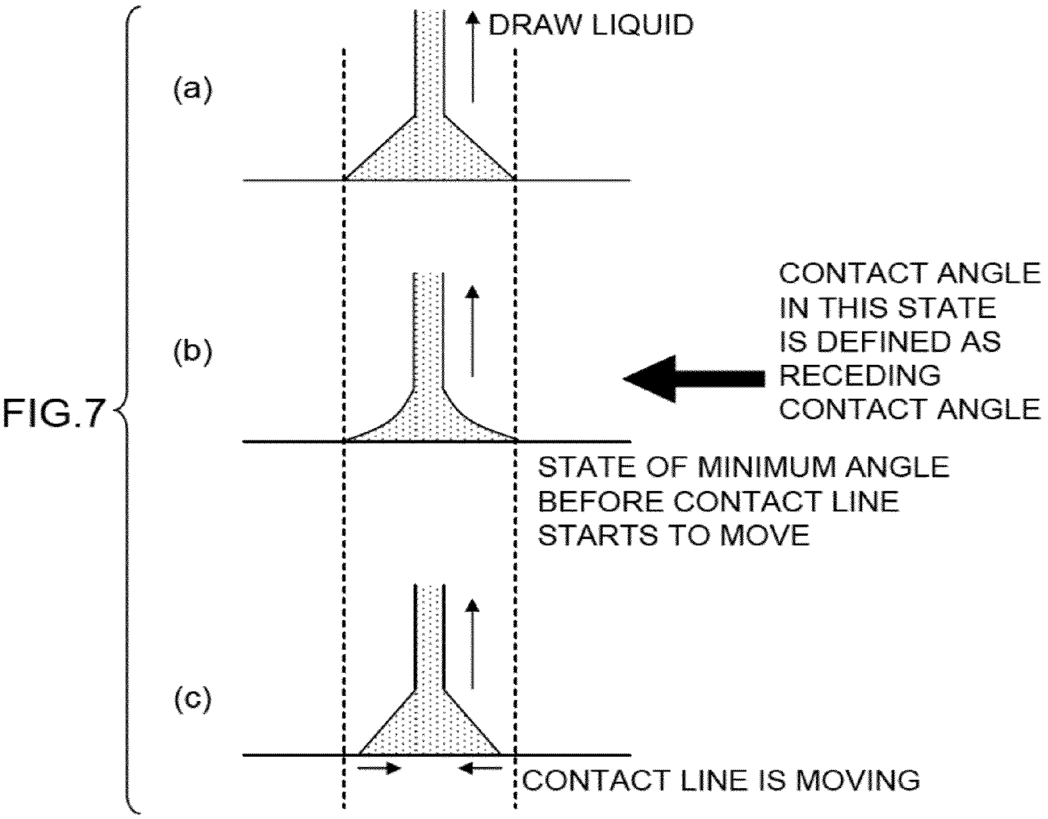
FIG. 7 is an illustrative diagram showing a state of measuring the receding contact angle.

FIG. 7 is an illustrative diagram showing a state of measuring the receding contact angle. As shown in FIG. 6, when the liquid starts to be drawn by means of the syringe, the volume of the droplet decreases while the contact line (base line) is maintained for some time (the states (a) and (b) in FIG. 7), and the contact angle becomes gradually smaller. As the draw is continued, the base line starts to move and the contact surface area becomes smaller (the state (c) in FIG. 7). The "receding contact angle" is defined as the contact angle in the state (b) in FIG. 7 of the minimum angle (contact angle) where the base line has not moved from the state (a) in FIG. 7.

Figure 8:
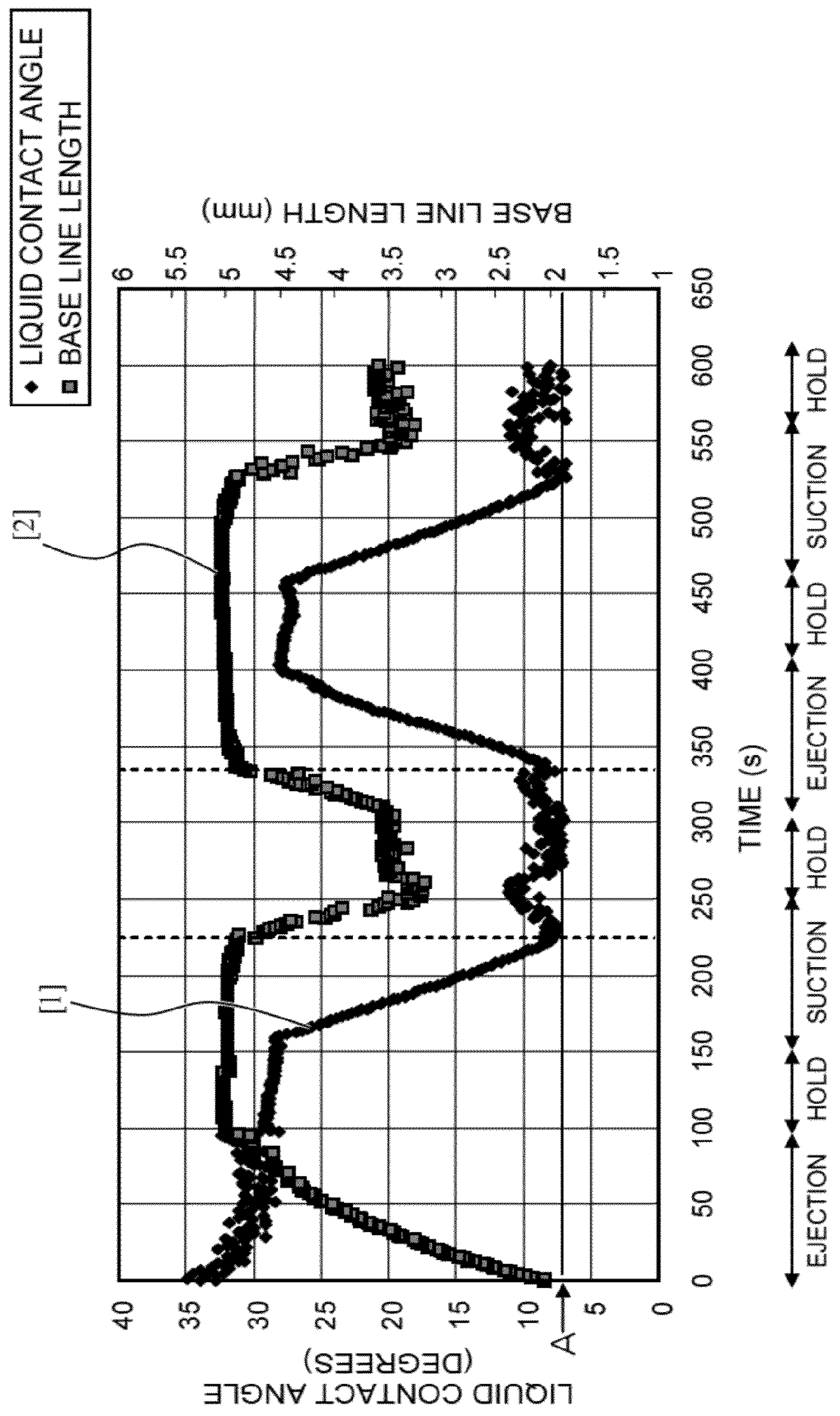
FIG. 8 is a graph showing a relationship between a liquid ejection and suction operation, and the liquid contact angle $\theta_L$ and the length of base line BL.

FIG. 8 is a graph showing movement of the syringe (ejection→hold→suction→hold→ejection→ . . . ), measurement values of the liquid contact angle $\theta_L$, and measurement values of the base line length BL. The horizontal axis indicates the time (seconds (s)) corresponding to the state of the syringe. The curve 1 in FIG. 8 represents the change in the liquid contact angle $\theta_L$ (degrees)(° indicated in the left-hand vertical axis). The curve 2 in FIG. 8 represents the change in the contact line (base line) length BL (millimeters (mm) indicated in the right-hand vertical axis).

According to the graph in FIG. 8, the receding contact angle is the contact angle (the value indicated by arrow A in FIG. 8, approximately, 7°) at the limit before the base line BL starts to decrease due to suction (immediately before the contact line starts to move).

<Change in Image Formation Results Due to Change in Receding Contact Angle>

Figure 9:
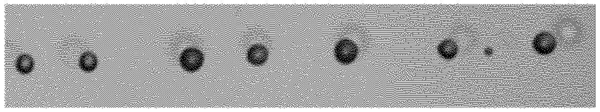
FIG. 9 shows a diagram comparing the image formation results for straight line patterns due to change in the receding contact angle of the ink with respect to the substrate.
Figure 9:
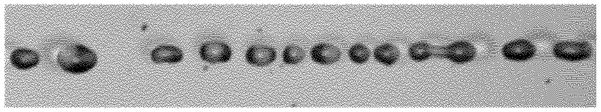
Figure 9:
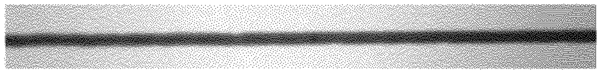
Figure 9:
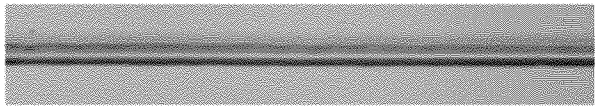

FIG. 9 shows a summary of change in the image formation results (shapes) for straight line patterns due to change in the receding contact angle of the ink with respect to the substrate. In an experiment, straight line image formation was carried out at a dot pitch of 20 μm and a printing frequency of 10 kHz, using inks of four types having respectively different receding contact angles with respect to the substrate (Comparative Examples 1 and 2, and Practical Examples 1 and 2).

Comparative Example 1 used the ink having the static contact angle of 25° and the receding contact angle of 16°. In this case, rather than a line shape, dot shapes were obtained in which a plurality of dots were distributed sparsely or discretely.

Comparative Example 2 used the ink having the static contact angle of 15° and the receding contact angle of 11°. In this case, rather than a line shape, dot shapes were obtained in which a plurality of dots were distributed.

Practical Example 1 used the ink having the static contact angle of 29° and the receding contact angle of 9°. In this case, as shown in FIG. 9, it was possible to form a clean straight line shape having a uniform line width.

Practical Example 2 used the ink having the static contact angle of 16° and the receding contact angle of 7°. In this case also, as shown in FIG. 9, it was possible to form a clean straight line shape having a uniform line width.

From the results in FIG. 9, it can be seen that if the receding contact angle exceeds 10°, then dot shapes are obtained, and if the receding contact angle is 10° or less, then a single line shape is obtained. In other words, it is desirable that the receding contact angle is not larger than 10°.

Further conditions which are even more desirable if combined with the condition relating to the receding contact angle (10° or less) described above, will now be explained.

<Change in Image Formation Results Due to Change in Static Contact Angle>

Figure 10:
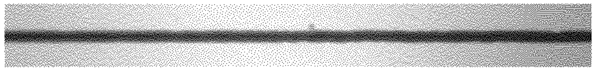
FIG. 10 shows a diagram comparing the image formation results for straight line patterns due to change in the static contact angle of the ink with respect to the substrate.
Figure 10:
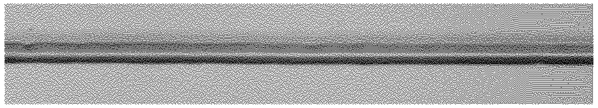
Figure 10:
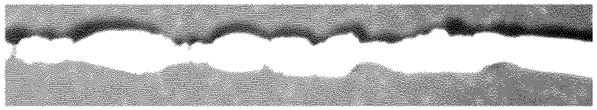

FIG. 10 shows a summary of change in the image formation results (shapes) for straight line patterns due to change in the static contact angle of the ink with respect to the substrate. In an experiment, straight line image formation was carried out at a dot pitch of 20 μm and a printing frequency of 10 kHz, using inks of three types having respectively different static contact angles with respect to the substrate (Practical Examples 1 and 2, and Comparative Example 3).

When the static contact angle is 10° or larger, as in Practical Examples 1 and 2, the stable line shapes are obtained. On the other hand, if the static contact angle is smaller than 10°, although the droplets combine together, instable portions in the line shape are observed in places (the line width is not uniform), as in Comparative Example 3. In other words, it is desirable that the static contact angle is not smaller than 10°.

Droplet Ejection Conditions

Figure 11:
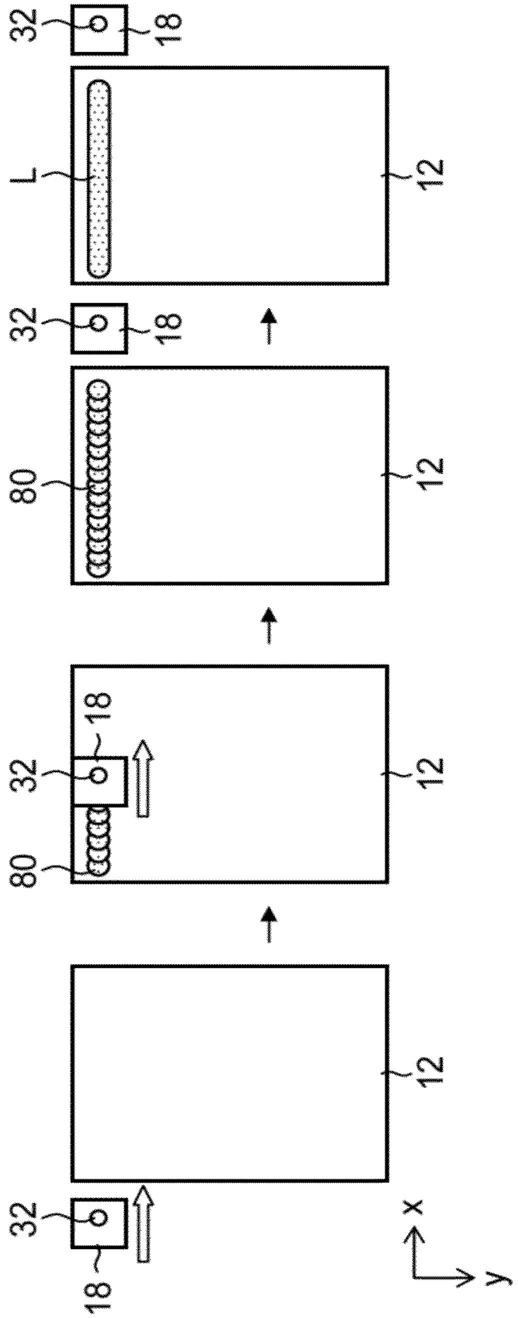
FIG. 11 is a diagram showing a schematic view of a procedure for forming an image of a straight line pattern on a substrate.

FIG. 11 is a diagram showing a schematic view of a procedure for forming an image of a straight line pattern L on the substrate 12 by scanning the substrate 12 in the x direction with the recording head 18. Here, for the purpose of the explanation, it is supposed that the recording head 18 has only one nozzle 32.

As shown in FIG. 11, the straight line pattern L is formed on the substrate 12 by successively ejecting droplets 80 of UV ink from the nozzle 32 while scanning the substrate 12 in the x direction with the recording head 18, and causing the deposited droplets 80 to combine together on the substrate 12. Below, conditions for preventing the occurrence of jaggedness or bulging in line image formation of this kind are investigated.

<Droplet Ejection Condition 1 (Dot Pitch p)>

Figure 12B:
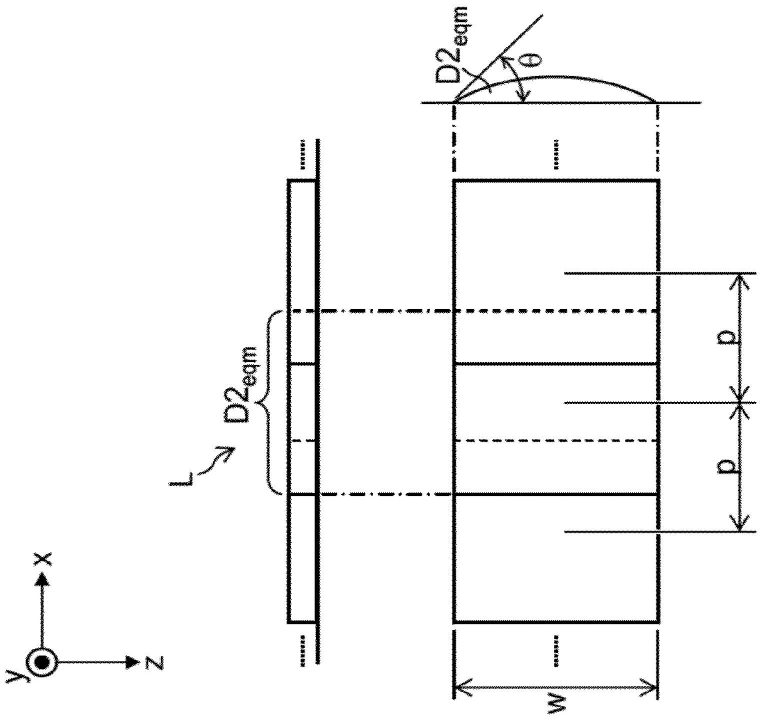
FIGS. 12A and 12B are schematic views of temporal change of droplets which have been ejected and deposited onto a substrate.
Figure 12A:
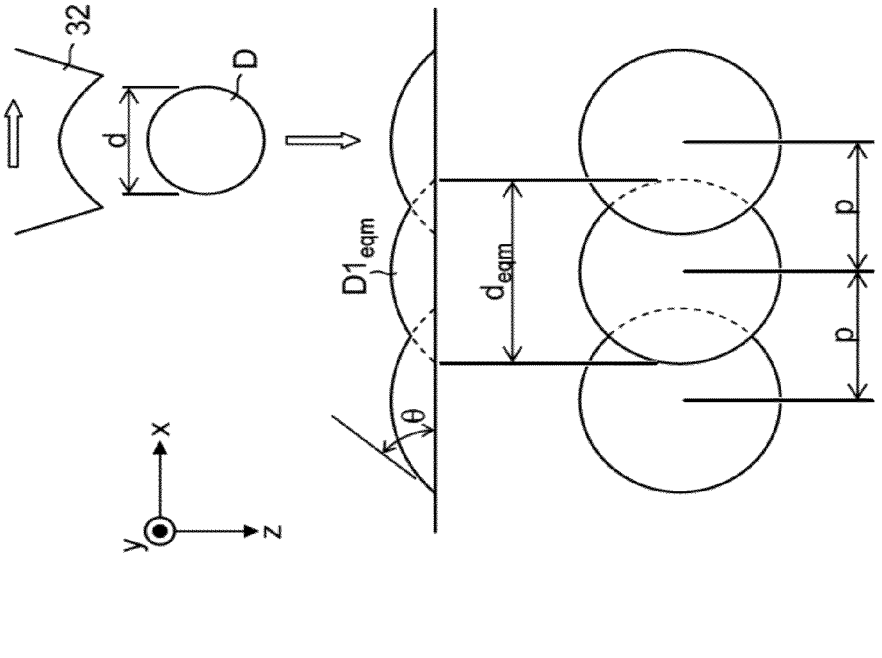

FIGS. 12A and 12B are schematic views of temporal change in droplets deposited on the surface of the substrate 12 (cross-sectional view and plan view). As shown in FIG. 12A, each droplet D1$_{eqm}$ that has been ejected from the recording head 18 and has landed on the surface of the substrate 12 has a substantially circular shape initially upon landing, and makes contact with adjacent droplets. As shown in FIG. 12B, the droplets D then wet and spread, and a pattern L is formed.

When the droplets have combined together and the final line pattern L has been formed, the outline of the pattern L is ideally a smooth straight line, and the shape of the combined droplet pattern, viewed as a whole, is approximately a semi-circular bar shape (a partial circular bar shape of a circular bar cut along a plane parallel to the axis). Consequently, omitting the respective ends of the line of the pattern L and looking in particular at the portion of the individual deposited droplet in the line, it can be considered that the droplet has changed from the hemispherical shape (in FIG. 12A) immediately after landing to the semicircular bar shape (FIG. 12B) after wetting and spreading.

Here, it is assumed (Assumption 1) that the substrate 12 is a medium into which the liquid forming the droplets D does not penetrate or permeate, and the volume of each droplet before and after landing on the substrate 12 is then preserved. Furthermore, it is assumed (Assumption 2) that the contact angles θ (rad) of the droplets D with respect to the substrate 12 are uniform.

In this case, the ratio (spreading rate) $\beta_{eqm}$ between the diameter $d_{eqm}$ (μm) of the droplet D1$_{eqm}$ upon landing on the substrate 12 and the diameter d (μm) of the droplet D before landing, where the droplet D before landing is assumed to have a spherical shape, is expressed as:

$$\beta_{eqm} = \frac{d_{eqm}}{d} = 2\left\{\left(\tan\frac{\theta}{2}\right)\left(3+\tan^2\frac{\theta}{2}\right)\right\}^{-\frac{1}{3}}. \quad (1)$$

In FIG. 12B, the cross-sectional area S1 (μm$^2$) of a section taken through the part D2$_{eqm}$ of the liquid in a plane parallel to the zy plane and passing through the center of the part D2$_{eqm}$ is expressed as:

$$S1 = \frac{1}{4}w^2\left(\frac{\theta}{\sin^2\theta} - \frac{\cos\theta}{\sin\theta}\right), \quad (2)$$

where w (μm) is the width of the pattern L. Then, the volume Va (μm$^3$) of the part D2$_{eqm}$ of the liquid is expressed as:

$$Va = \frac{1}{4}w^2 p\left(\frac{\theta}{\sin^2\theta} - \frac{\cos\theta}{\sin\theta}\right), \quad (3)$$

where p (μm) is the distance between the centers of the droplets which are adjacent to each other on the substrate 12 (the nozzle pitch).

On the other hand, since the diameter of the droplet D before landing is d (μm) as shown in FIG. 12A, then the volume Vb (μm$^3$) of the droplet D before landing is expressed as:

$$Vb = 1/6\pi d^3. \quad (4)$$

According to Assumption 1 above, the volume of the droplet D before and after landing is unchanged, and by solving Va=Vb, the line width w is then expressed as:

$$w = \sqrt{\frac{2\pi d^3}{3p\left(\frac{\theta}{\sin^2\theta} - \frac{\cos\theta}{\sin\theta}\right)}}. \quad (5)$$

In order to avoid the occurrence of jaggedness, the line width w should not be smaller than the diameter $d_{eqm}$ of the droplet D1$_{eqm}$ upon landing on the substrate 12, i.e., $w \geq d_{eqm}$ ($=\beta_{eqm} \cdot d$). Hence, by solving the equation (5) with respect to the dot pitch p, the conditional Formula (6) for the dot pitch p is obtained as:

$$p \leq \frac{2\pi d}{3\beta_{eqm}^2\left(\frac{\theta}{\sin^2\theta} - \frac{\cos\theta}{\sin\theta}\right)} \quad (6)$$

-continued $$= \frac{\pi d}{6\left(\frac{\theta}{\sin^2\theta} - \frac{\cos\theta}{\sin\theta}\right)\left\{\tan\frac{\theta}{2}\left(3+\tan^2\frac{\theta}{2}\right)\right\}^{-\frac{2}{3}}}.$$

By controlling the dot pitch p so as to satisfy the condition of Formula (6), it is possible to prevent the occurrence of jaggedness in the outline edges of the pattern L.

On the other hand, a condition which inevitably produces jaggedness is the condition where the line width w is smaller than the diameter $d_{eqm}$ of the droplet $\mathbf{D1}_{eqm}$ upon landing on the substrate 12. This is because, under this condition, at the time that the droplets make contact with each other, each droplet has already set and spread further than the line width, and due to the pinning effects of the contact lines, it is not possible to obtain a line having the width that is equal to or smaller than the diameter of the droplet that has already wet and spread. The condition in this case is w>p, which yields the following Formula (7):

$$w = \sqrt{\frac{2\pi d^2}{3p\left(\frac{\theta}{\sin^2\theta} - \frac{\cos\theta}{\sin\theta}\right)}} > p. \tag{7}$$

Solving Formula (7) in respect of p yields the following Formula (8):

$$d\sqrt[3]{\frac{2\pi}{3\left(\frac{\theta}{\sin^2\theta} - \frac{\cos\theta}{\sin\theta}\right)}} > p. \tag{8}$$

Hence, the condition under which jaggedness could be avoided is given as:

$$d\sqrt[3]{\frac{2\pi}{3\left(\frac{\theta}{\sin^2\theta} - \frac{\cos\theta}{\sin\theta}\right)}} \le p. \tag{9}$$

<Droplet Ejection Condition 2 (Time Interval Between Droplet Ejections)>

Figure 13:
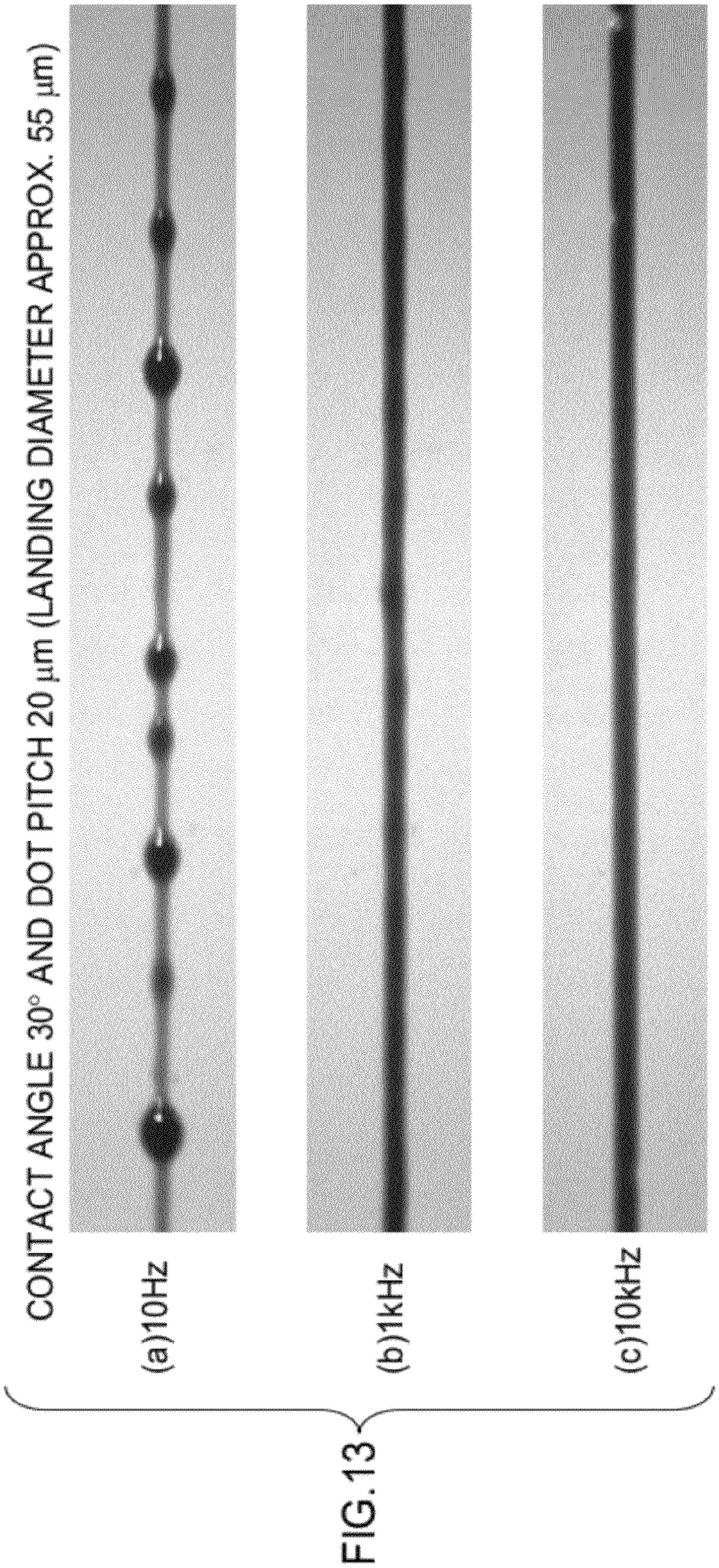
FIG. 13 is a diagram showing the stability of line width depending on the printing frequency.

Next, the time interval between droplet ejections is described. FIG. 13 shows the stability of the line widths w when images of lines were formed under conditions satisfying the above-described Formula (6), with static contact angle θ=30°, landing diameter $d_{eqm}$=55 μm and dot pitch p=20 μm, while varying the number of times of ejection of droplets D per second (the "printing frequency" or "ejection frequency"). In FIG. 13, (a), (b) and (c) show image formation results for the printing frequency of 10 Hz, 1 kHz and 10 kHz, respectively.

As seen from these results, it was possible to suppress bulging by carrying out high-frequency printing at a printing frequency of not lower than 1 kHz, with a static contact angle of approximately 30°. Below, reference simply to the "contact angle" means the static contact angle. When a similar experiment was carried out while also varying the contact angle conditions, the occurrence of bulging could be suppressed under lower printing frequency conditions, when the contact angle was smaller. Conversely, when the contact angle was larger, the occurrence of bulging was suppressed by setting higher printing frequency conditions. From this finding, it can be regarded that the occurrence of bulging is affected by the time taken for wetting and spreading, which is governed by the contact angle.

Figure 14:
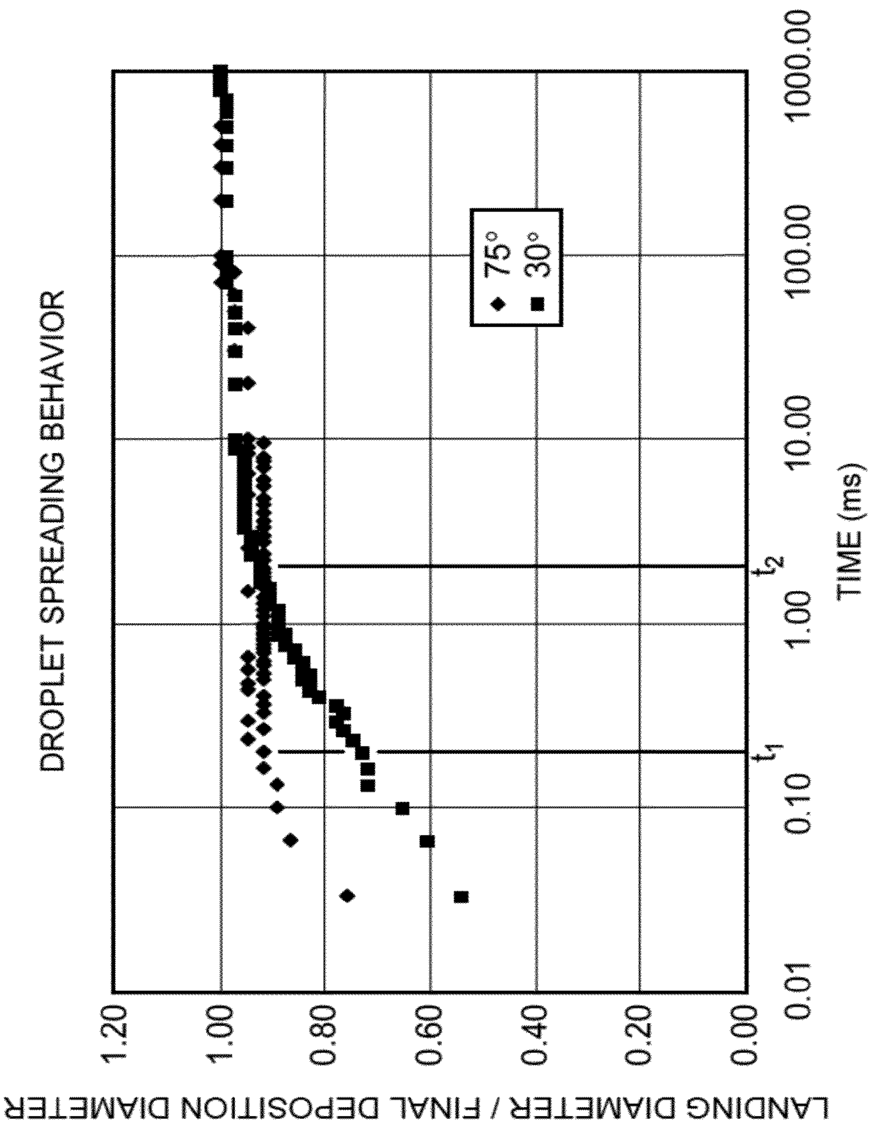
FIG. 14 is a graph showing the wetting and spreading behavior of droplets depending on the static contact angle.

FIG. 14 is a graph which compares the wetting and spreading behavior of droplets depending on contact angle. The time period until reaching equilibrium due to wetting and spreading was investigated for each of cases of a contact angle of 30° and a contact angle of 75°. The horizontal axis in FIG. 14 indicates the time t (ms) in a logarithmic scale, and the vertical axis indicates the ratio between the landing diameter immediately after landing and the final deposition diameter ("landing diameter/final deposition diameter"). In other words, the vertical axis indicates the landing diameter normalized with respect to the final deposition diameter.

Under the conditions of 75° contact angle, the time until the droplet had almost completely spread and nearly reached the final deposition diameter was $t_1$ (approximately 0.2 ms), whereas under the conditions of 30° contact angle, the time until the droplet had almost completely spread and nearly reached the final deposition diameter was $t_2$ (approximately 2 ms). In other words, when the contact angle is 30°, the droplets take approximately 10 times as long to reach equilibrium compared to when the contact angle is 75°.

In this way, the time taken until the droplet wets and spreads completely (the time required until reaching a state of equilibrium) varies greatly with change in the contact angle. From an empirical finding based on experimentation, it is thought that the time required until the droplet wets and spreads completely is inversely proportional to approximately the cube of the contact angle. Consequently, from the viewpoint of suppressing bulging, it is desirable to deposit mutually adjacent droplets successively before the group of deposited droplets wets and spreads (within the duration that the droplets take to reach equilibrium). Therefore, desirably, the greater the contact angle, the higher the printing frequency (the shorter the time interval between droplet ejections).

Based on experimentation, if the contact angle is 30°, it is desirable that the deposition time difference (time interval between droplet ejections) is not longer than 1 ms. Hence, if the contact angle is generalized as a parameter, the conditional Formula (10) is obtained as:

$$t \le \left(\frac{\pi}{6\theta}\right)^3 \times 0.001. \tag{10}$$

In other words, by carrying out high-frequency printing (droplet ejection) which achieves a deposition time interval that satisfies the conditional Formula (10), a state of equilibrium is formed in a situation where the group of deposited droplets have joined together on the substrate. By this means, it is possible to suppress small periodical bulges and jaggedness which occur due to a group of deposited droplets forming a small aggregate of joined droplets on the substrate when printing at low frequency.

<Time Interval Until Carrying Out Curing Process after Droplet Ejection>

Figure 15:
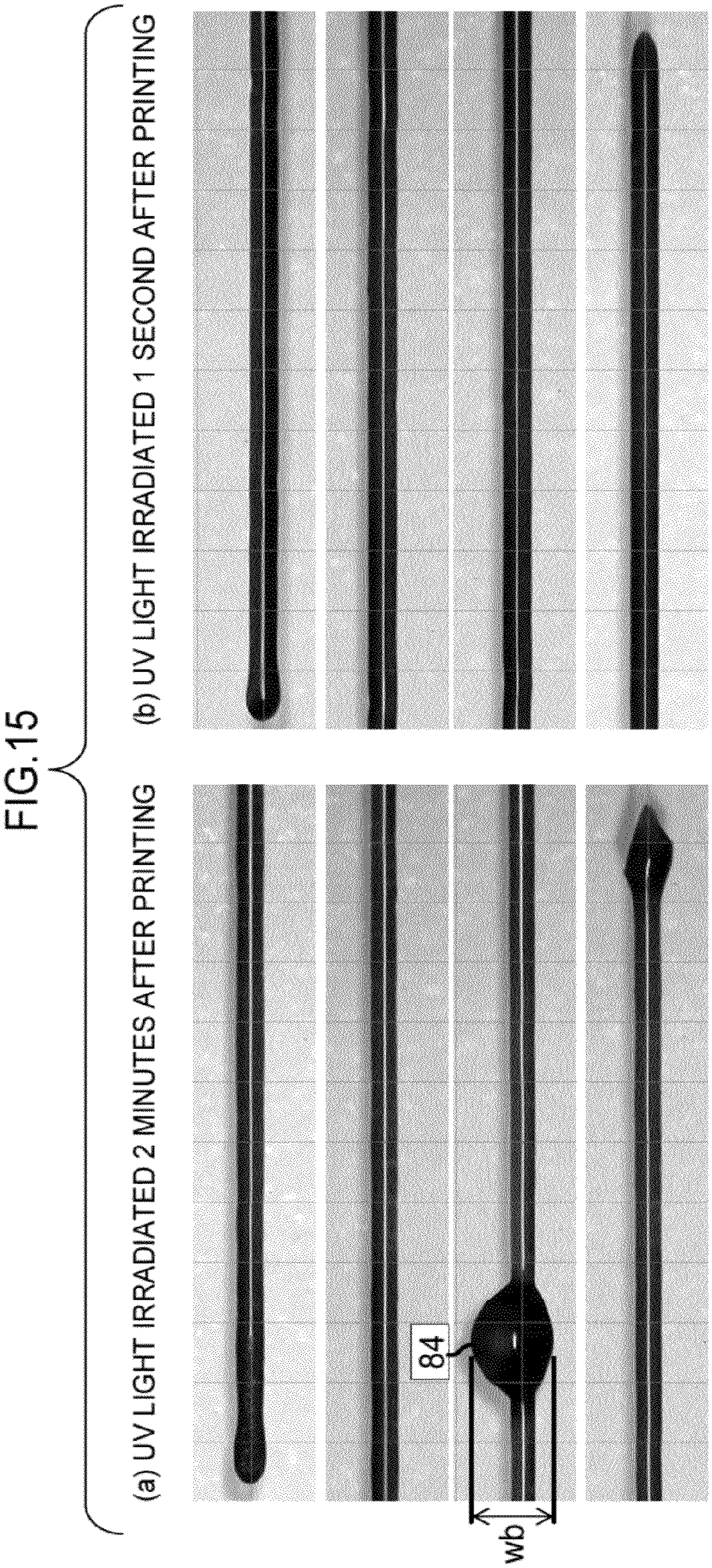
FIG. 15 is a diagram comparing the occurrence or non-occurrence of bulging depending on the time at which a curing process is carried out after forming an image of a line pattern.

FIG. 15 shows examples of line patterns obtained when curing processes were carried out by irradiating UV light from the UV light irradiation device 20 approximately two minutes (the case (a)) and one second (the case (b)), respectively, after forming images of line patterns on the substrate 12 by the recording head 18.

In both of the cases (a) and (b) in FIG. 15, the droplet ejection conditions satisfied the conditions stated in Formula (6) given above, and here, the contact angle was 30°, the dot pitch was 5 μm and the printing frequency was 4 kHz. Furthermore, in each of the cases (a) and (b) in FIG. 15, the line-shape pattern in which a line segment approximately 1 cm long was formed, the pattern being divided into four images shown side by side in FIG. 15.

As a comparison between the patterns of the cases (a) and (b) shown in FIG. 15 clearly reveals, when the curing process was carried out approximately two minutes after printing, the large liquid pool (bulge 84) developed in the line (the case (a)), whereas when the curing process was carried out approximately one second after printing, no bulging occurred (the case (b)). In this way, by carrying out a curing process immediately after droplet ejection, the liquid on the substrate 12 is caused to lose fluidity, and therefore the occurrence of bulging can be suppressed.

Figure 16:
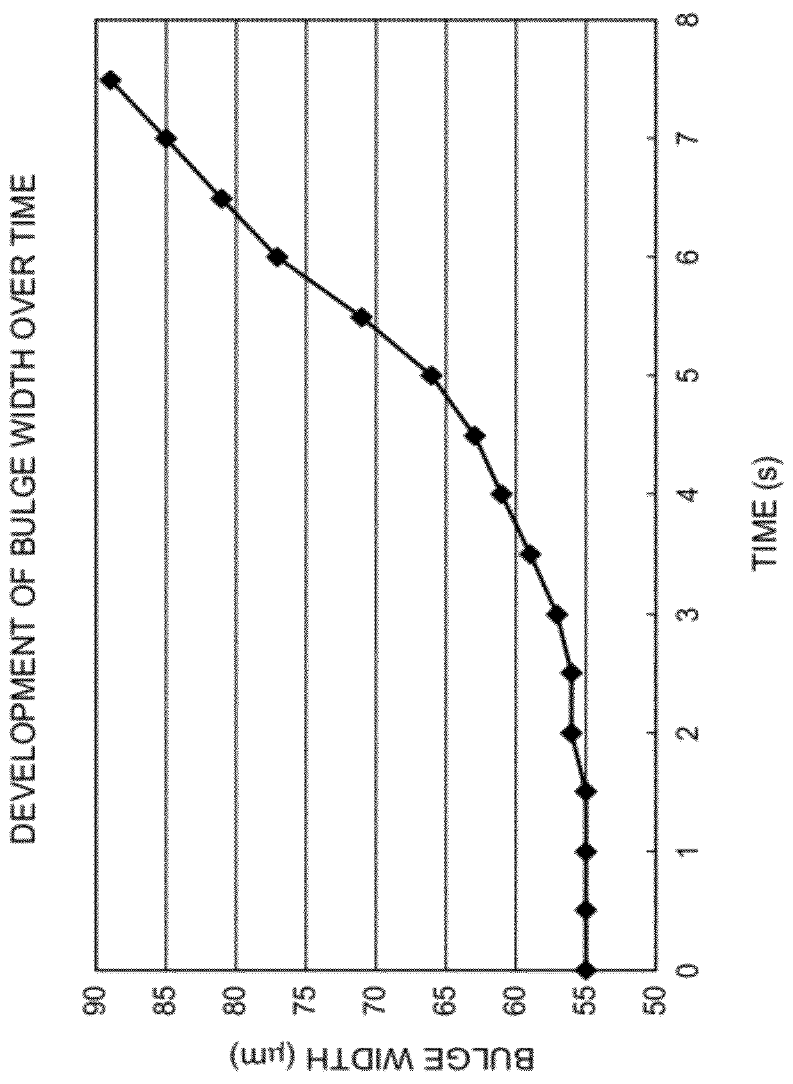
FIG. 16 is a graph investigating the relationship between the elapsed time after printing and the bulge width.

FIG. 16 is a graph investigating the relationship between the elapsed time after printing and the bulge width. The "bulge width" referred to here indicates the width in the thickness direction of the line in the line pattern L, as denoted with "wb" in FIG. 15.

The horizontal axis in FIG. 16 represents the elapsed time t (s) after printing, and the vertical axis represents the bulge width wb (μm). FIG. 16 shows a case where droplet ejection was performed under the same conditions as the case (a) in FIG. 15. As shown in FIG. 16, the bulge started to grow after approximately 1.5 seconds from printing, and as time passed, the bulge gradually grew to a large size.

Since the bulge grows due to the ink having fluidity on the substrate 12 after droplet deposition, then it is desirable to cure the ink by irradiating UV ink within one second.

From this finding, there are limits on the distance between the droplet ejection position by the recording head 18 and the UV irradiation position by the UV light irradiation device 20 in the line image forming apparatus 10 according to the present embodiment, and on the conveyance speed of the substrate 12.

Figure 17:
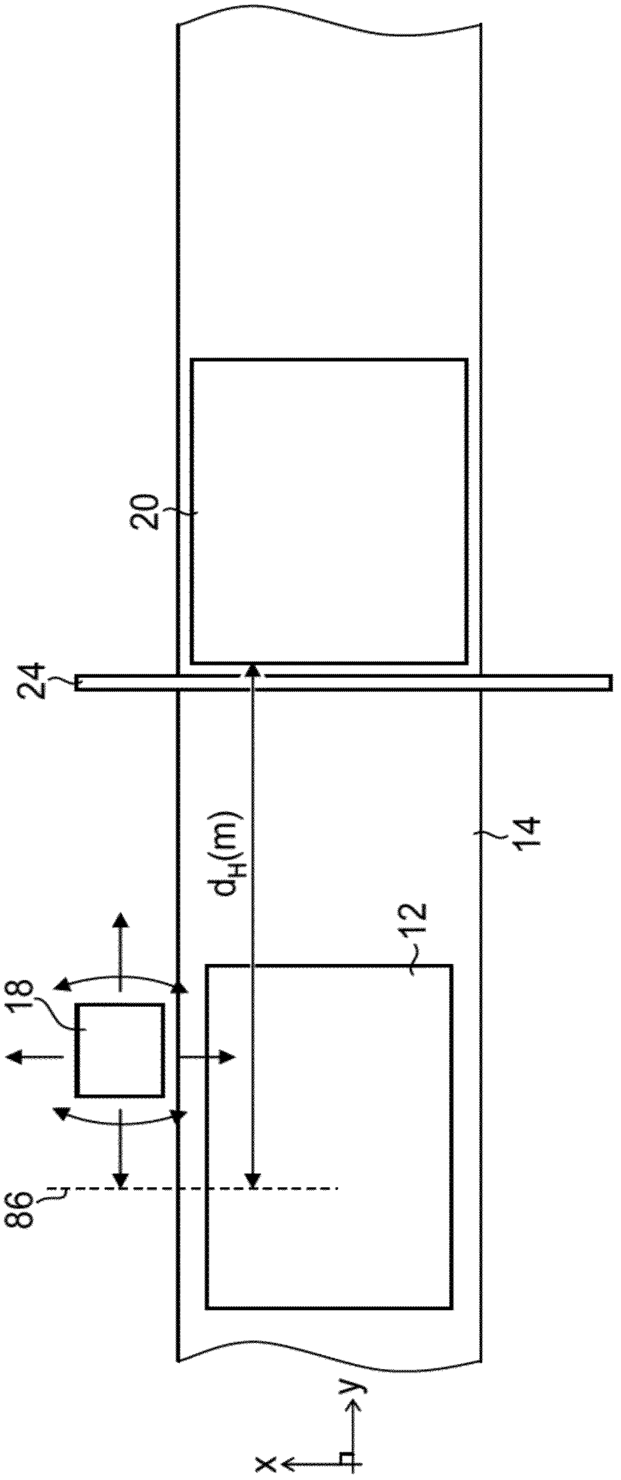
FIG. 17 is a plan diagram for describing the limits of the range of movement of the recording head in the line image forming apparatus according to the present embodiment.

More specifically, as shown in FIG. 17, the movable range of the recording head 18 in the y axis direction is such that the distance $d_H$ (m) to the UV light irradiation device 20 from the position where the recording head 18 is furthest separated from the UV light irradiation device 20 in the substrate conveyance direction (the position indicated with a dashed line 86), is not larger than the distance given by the product of the conveyance speed v (m/s) of the substrate 12 and one second, i.e., $$d_H\,(\mathrm{m}) < 1\,(\mathrm{s}) \times v\,(\mathrm{m/s}). \qquad (11)$$

The movable range of the recording head 18 is restricted (limited) and the arrangement position of the UV light irradiation device 20 and the conveyance speed of the substrate 12 (linear speed of the belt 14) are controlled so as to satisfy these conditions.

When forming a line perpendicular to the substrate conveyance direction (the line parallel to the x direction in FIG. 17), on the substrate 12 which is conveyed at a uniform speed v (m/s) by the belt 14, the recording head 18 is also moved at the same speed as the substrate conveyance speed (setting the relative speed in the y direction to be 0).

When forming a line parallel to the substrate conveyance direction, the movement speed of the recording head 18 is set on the basis of the conditions including the printing frequency and the dot pitch. When forming a diagonal line oblique to the substrate conveyance direction, the movement speed of the recording head 18 is set in such a manner that the recording head 18 moves in the direction of the diagonal line, relatively with respect to the substrate 12.

Even when forming any of lines of perpendicular, parallel and oblique to the substrate conveyance direction, it is possible to perform curing before the occurrence of bulges, by satisfying the conditions in Formula (11) with respect to the maximum separation distance $d_H$ (m) shown in FIG. 17 and the substrate conveyance speed v (m/s).

Furthermore, from experimentation, the time taken for a portion of the line shape to start swelling after image formation is inversely proportional to approximately the cube of the contact angle. Consequently, when the time T until curing is specified by taking the contact angle as a parameter, the time until a portion of the line shape starts to swell after image formation is inversely proportional to the cube of the contact angle, and therefore if the contact angle is generalized as a parameter, the conditional Formula (12) is obtained as:

$$T \le \left(\frac{\pi}{6\theta}\right)^3. \qquad (12)$$

From the same perspective as the above-described Formula (11), if the condition in Formula (12) is applied and generalized, then the conditional Formula (13) is obtained as:

$$d_H < \left(\frac{\pi}{6\theta}\right)^3 \times v. \qquad (13)$$

More specifically, it is possible to suppress the occurrence and growth of bulges by carrying out instant curing after printing which satisfies the conditional Formula (13), in accordance with the contact angle.

Mode Using Multi-Nozzle Head

In the embodiment described with reference to FIG. 5, a line image is formed by one nozzle, and it is also possible to adopt a mode where a plurality of nozzles are arranged in the composition of the recording head 18. For instance, as shown in FIG. 18A, it is possible to use a recording head (line head) 18' in which a plurality of nozzles 32 are aligned in one row at a uniform nozzle pitch Np.

Figure 18B:
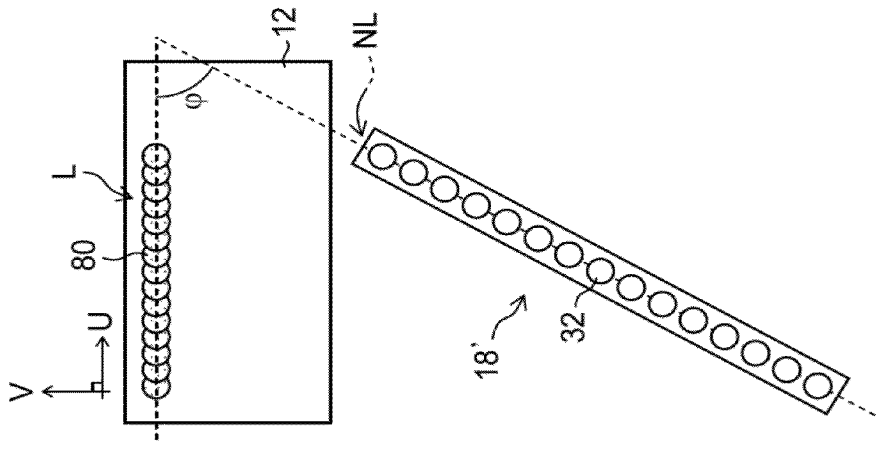
FIGS. 18A and 18B are diagrams showing schematic views of a scanning control procedure when forming an image of a pattern L by performing a relative scanning action of a recording head having a plurality of nozzles with respect to a substrate.
Figure 18A:
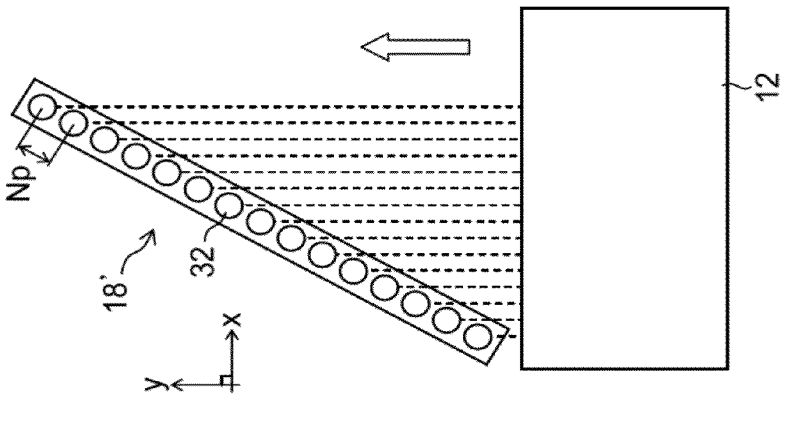

FIGS. 18A and 18B are diagrams showing schematic views of a procedure of scanning control for forming an image of a pattern L by performing a relative scanning action of the recording head 18' with respect to the substrate 12 in the y direction. In FIG. 18A, the conveyance direction of the substrate 12 is the y direction (sub-scanning direction) and the direction parallel to the surface of the substrate 12 and perpendicular to the y direction is the x direction (main scanning direction). Furthermore, the direction perpendicular to the xy plane is the z direction, the direction in which the straight line pattern L is formed (pattern forming direction, printing direction) is the U direction, and the direction parallel to the substrate 12 and perpendicular to the U direction is the V direction.

As shown in FIGS. 18A and 18B, at least two nozzles 32 are used when forming one line pattern L. The recording head 18' is held in such a manner that the straight line linking the centers of the nozzles 32 (the nozzle line NL) forms an angle ϕ (°) (0°<ϕ<90°) with respect to the printing direction (U direction). By performing droplet ejection sequentially from the nozzles 32 while performing a relative scanning action of the recording head 18' with respect to the substrate 12 in the sub-scanning direction (y direction) and while maintaining a state where the angle between the nozzle line NL and the U axis is ϕ (°), an image of a line (for instance, a straight line) pattern L extending in the U direction is formed. It is also possible to adopt a mode in which the nozzle line NL of the recording head 18' is arranged in parallel with the x direction and the substrate 12 is turned in the xy plane so as to be inclined by an angle of ϕ with respect to the x direction.

In the case of the mode in FIGS. 18A and 18B, droplet ejection is controlled so as to satisfy the conditional Formula (10) in respect of the deposition time difference of the deposited droplets 80 which are aligned in the U direction on the substrate 12. According to the mode in FIGS. 18A and 18B, it is possible to control the deposition time interval (the printing frequency onto the substrate 12) by means of a combination of the ejection frequency control of the recording head 18' and the conveyance speed control of the substrate 12.

Second Embodiment

Figure 19:
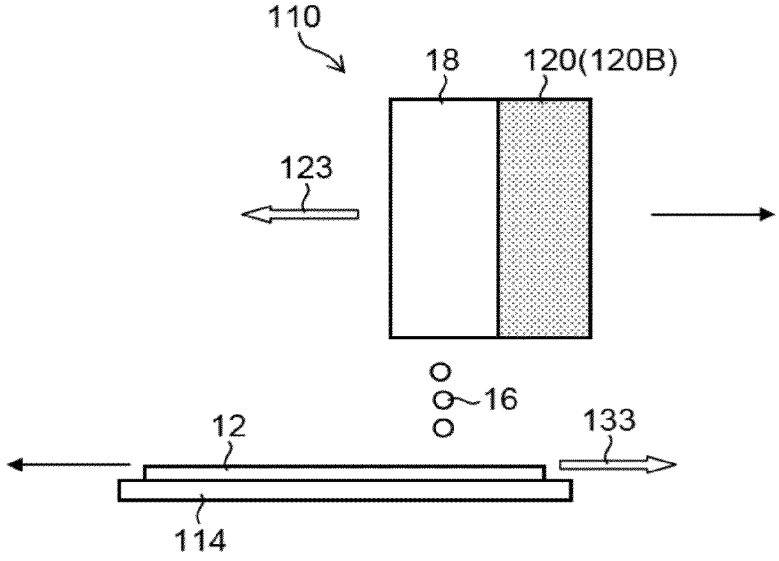
FIG. 19 is a side view diagram showing the composition of a line image forming apparatus according to a second embodiment of the present invention.
Figure 20:
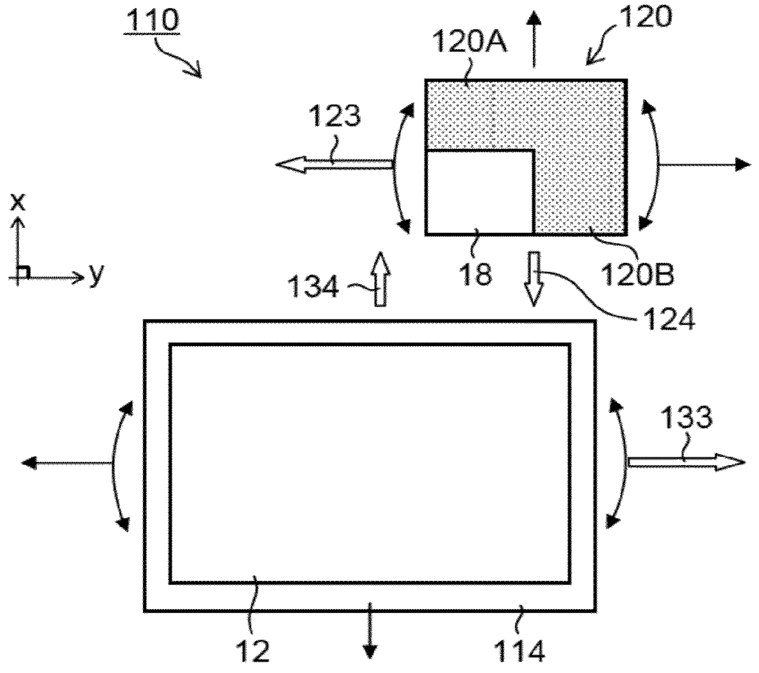
FIG. 20 is a plan view diagram of the line image forming apparatus shown in FIG. 19.

FIG. 19 is a diagram showing a side view of a line image forming apparatus 110 according to a second embodiment of the present invention, and FIG. 20 is a plan view of same. In FIGS. 19 and 20, elements which are the same as or similar to the composition described with reference to FIGS. 1 and 2 are denoted with the same reference numerals, and description thereof is omitted here.

The line image forming apparatus 110 according to the second embodiment shown in FIGS. 19 and 20 employs a supporting plate 114 as a conveyance device for the substrate 12. The supporting plate 114 is able to move in the x direction and the y direction which is perpendicular to the x direction, by means of a movement mechanism (for example, an xy table, or the like), which is not illustrated. It is also possible to arrange a mechanism for turning the supporting plate 114 in the xy plane.

Furthermore, a UV laser irradiation device 120 is attached to the recording head 18. The recording head 18 and the UV laser irradiation device 120 are movable in an integrated fashion, and can be moved in the x direction and the y direction by means of a head movement mechanism (not shown). It is also possible to arrange a mechanism for turning the recording head 18 and the UV laser irradiation device 120 in the xy plane.

For the UV light irradiation device 120 disposed in the vicinity of the recording head 18, it is suitable to employ a laser having a small beam widening angle.

As shown in FIG. 20, the UV laser irradiation device 120 is a unit constituted of a first UV laser irradiation device 120A, which is arranged in the x direction as viewed from the recording head 18, and a second UV laser irradiation device 120B, which is arranged in the y direction as viewed from the recording head 18.

Although it is possible to adopt a mode in which a UV laser irradiation device is installed so as to completely surround the four peripheral faces of the recording head 18 in FIG. 20, it is not necessarily mandatory to install the UV laser irradiation device around the whole perimeter of all four faces, and it is sufficient for the UV laser irradiation device to be provided in at least one direction.

In FIG. 20, one UV laser irradiation device (120A or 120B) is arranged in each of the x direction and the y direction, and no UV laser irradiation device is installed on the opposite side of the recording head 18 from the first UV laser irradiation device 120A, and no UV laser irradiation device is installed on the opposite side of the recording head 18 from the second UV laser irradiation device 120B.

According to this relative arrangement of the recording head 18 and the UV laser irradiation devices 120A and 120B, the recording head 18 carries out printing (droplet ejection) while the recording head 18 is moved relatively in the direction of the white arrows 123 and 124 in FIGS. 19 and 20 with respect to the substrate 12. Alternatively, droplet deposition is performed from the recording head 18 when the substrate 12 is moved relatively in the directions of the white arrows 133 and 134 in FIGS. 19 and 20 with respect to the recording head 18.

Figure 21:
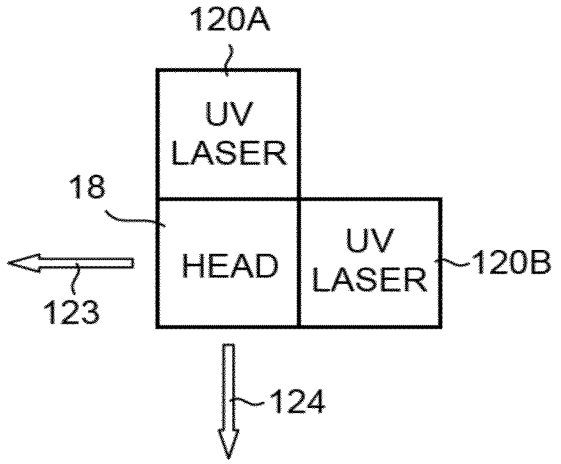
FIG. 21 is a schematic drawing showing the relative positions of a recording head and an UV laser irradiation device, and the head movement direction during droplet ejection.

FIG. 21 is a schematic drawing showing the relative arrangement of the recording head 18 and the UV laser irradiation devices 120A and 120B, and the directions of movement of the recording head 18 during droplet ejection. As shown in FIG. 21, droplet ejection is performed when the recording head 18 is moved in the direction of the arrow 123 or 124. By this means, it is possible to cure the droplets deposited on the substrate 12 by performing irradiation from the first UV laser irradiation device 120A or the second UV laser irradiation device 120B immediately after the droplet ejection by the recording head 18.

Figure 22A:
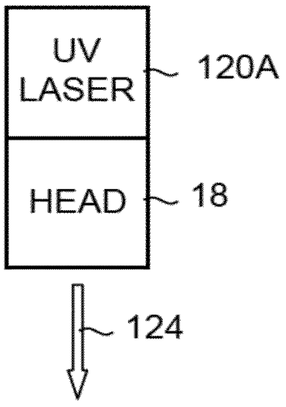
FIGS. 22A and 22B are schematic drawings showing the relative positions of recording heads and UV laser irradiation devices, and the head movement directions during droplet ejection.
Figure 22B:
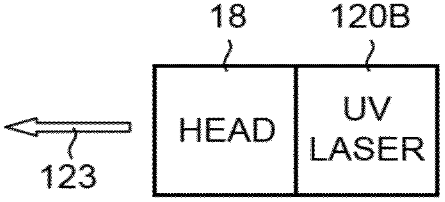

FIGS. 22A and 22B show cases where only one UV laser irradiation device is installed. In this case also, similarly to FIG. 21, according to the relative arrangement of the recording head 18 and the UV laser irradiation device 120A or 120B, printing (droplet ejection) is carried out only when the unit is moved in a movement direction (indicated by white arrow 123 or 124) where the recording head 18 is on the leading side in the movement direction and the UV laser irradiation device 120A or 120B is on the trailing side in the movement direction.

Furthermore, the laser irradiation timing and irradiation time, and the like, of the UV laser irradiation devices 120A and 120B are controlled in coordination with the control of droplet ejection by the recording head 18. In this case, the irradiation duration time is set from the viewpoint of irradiating ultraviolet light having the required amount of energy to polymerize (cure) the UV ink that has been deposited on the substrate 12. For example, a desirable composition is one where UV laser light is irradiated for at least three seconds after an ejection signal has been input to any one of the ejection nozzles in the recording head 18.

Examples of UV Ink

As the functional liquid used for wire image formation, it is possible to employ a liquid dispersion in which conductive micro-particles are dispersed in a dispersion medium. For example, silver nano-particles are used as the conductive micro-particles, and water or tetradecane is used as the dispersion medium. The conductive micro-particles are not limited to silver, and may also be gold, copper, palladium, nickel, or the like.

Furthermore, by including a UV-curable monomer in the liquid and irradiating ultraviolet light onto the deposited liquid, it is possible to polymerize and cure the UV-curable monomer in the liquid.

The UV-curable monomer produces a polymerization or cross-linking reaction due to initiating species, such as radicals, generated from the polymerization initiator, or the like, and has a function of curing the composition which contains these.

The UV-curable monomer can use a commonly known polymerizable or cross-linkable material which produces a polymerizing or cross-linking reaction, such as a radical polymerization reaction or a dimerization reaction, or the like. Possible examples are an addition polymerizable compound having at least one ethylenically unsaturated double bond, a high polymer compound having a maleimide group in a side chain, or a high polymer compound having a cinnamyl group, cinnamylidene group or a chalcone group having a photodimerizable unsaturated double bond adjacent to an aromatic nucleus, in a side chain. Of these, an addition polymerizable compound having at least one ethylenically unsaturated double bond is more desirable, and such a compound selected from compounds (monofunctional or polyfunctional compounds) having at least one and desirably two or more ethylenically unsaturated terminal bonds is especially desirable. More specifically, it is possible to select a compound appropriately from compounds which are commonly known in the industrial field of the present invention, and this includes, for example, monomers, pre-polymers (namely, dimers, trimers or oligomers), or mixtures of these, and chemical forms such as copolymers of same.

It is possible to use either one type of UV-curable monomer independently, or a combination of two or more types of UV-curable monomer.

As the UV-curable monomer which can be used in the implementation of the present invention, it is particularly desirable to use one of various commonly known radically polymerizable monomers which produce a polymerization reaction due to initiating species which are generated from the radical initiating agent.

Possible examples of radical polymerizable monomers are: (meth)acrylates, (meth)acrylamides, aromatic vinyls, vinyl ethers, and compounds having an internal double bond (maleinic acid, and the like). Here, "(meth)acrylate" means any one or both of "acrylate" and "methacrylate", and "(meth) acryl" means any one or both of "acryl" and "methacryl".

Third Embodiment

Use of Ink Containing Volatile Solvent

In the third embodiment described below, a liquid produced by mixing a functional component (for example, metal nano-particles) with a volatile solvent (for example, water or tetradecane) is used, and an image of a line pattern is formed on the substrate by performing a relative scanning action of a recording head with respect to a substrate. For the apparatus composition, it is possible to employ a composition similar to the first embodiment described with reference to FIG. 1, and the like, and the second embodiment described with reference to FIG. 19, and the like. Furthermore, it is possible to adopt a mode omitting the UV light irradiation device 20 from the first embodiment in FIG. 1, or the like, or a mode omitting the UV laser irradiation device 120 from the second embodiment in FIG. 19, or the like.

In the third embodiment, the conditions including the receding contact angle condition (not larger than 10°) described in relation to the first embodiment and the second embodiment are similarly applied. Moreover, further conditions which are even more desirable if combined with the condition relating to the receding contact angle (10° or less) described above, are explained below.

<Conditions Relating to Ratio of Solvent (Volatile Component) in Liquid>

When forming a line pattern by means of liquid including a volatile solvent such as that in the third embodiment, if the ratio of the volatile solvent contained in the liquid is high, then bulges are especially liable to occur. Below, the conditions relating to the desirable ratio of the solvent in the liquid are investigated.

Here, the liquid deposited onto the substrate 12 is a liquid (ink) in which silver nano-particles are dispersed in a solvent of water or tetradecane (both of which have volatility), for example.

As described above, when an image of a pattern L is formed by depositing droplets of liquid onto the substrate 12, a bulge is liable to occur if the volume of the solvent (liquid component) on the pattern L is too large in relation to the line width w. In order to prevent the occurrence of bulges, the amount of solvent remaining on the substrate 12 when the solvent evaporates off after the droplet D has landed on the substrate 12 is decreased to a level where a bulge does not occur. More specifically, the diameter $d_{eqm}$ (μm) of the droplet D after the droplet has wet and spread on the substrate 12 and the solvent has evaporated is equal to the line width w (μm). When $w=d_{eqm}$, the volume $V_1$ (μm$^3$) of the part D$\mathbf{2}_{eqm}$ of the liquid after the liquid has wet and spread and the solvent has evaporated off is expressed as:

$$V_1 = p\left\{\theta\left(\frac{d_{eqm}}{2\sin\theta}\right)^2 - \frac{d_{eqm}^2\cos\theta}{4\sin\theta}\right\}. \tag{14}$$

On the other hand, since the diameter of the droplet D before landing is d, then the volume $V_2$ (μm$^3$) of the droplet D before landing is expressed as:

$$V_2 = \frac{4}{3}\pi\left(\frac{d}{2}\right)^3. \tag{15}$$

Consequently, the ratio of the volatile solvent contained in the liquid (volume ratio) is expressed as:

$$\begin{aligned}\frac{V_2 - V_1}{V_2} \times 100\% &= \left[1 - \frac{p\left\{\theta\left(\frac{d_{eqm}}{2\sin\theta}\right)^2 - \frac{d_{eqm}^2\cos\theta}{4\sin\theta}\right\}}{\frac{4}{3}\pi\left(\frac{d}{2}\right)^3}\right] \times 100\% \\ &= \left[1 - \frac{6p\left(\frac{\theta}{\sin^2\theta} - \frac{\cos\theta}{\sin\theta}\right)\left\{\tan\frac{\theta}{2}\left(3 + \tan^2\frac{\theta}{2}\right)\right\}^{-\frac{2}{3}}}{\pi d}\right] \times 100\%.\end{aligned} \tag{16}$$

By making the ratio of the volume of the volatile solvent in the liquid not less than the value expressed by the above-described Formula (16), it is possible to prevent the occurrence of bulges.

<Droplet Ejection Condition 3 (Time Interval Between Droplet Ejections)>

Next, the time interval between droplet ejections is described. The following Table 1 shows the stability of the line widths w when images of lines were formed under conditions of droplet diameter d=26.0 μm, $d_{eqm}$=55.5 (μm), and contact angle θ=30° (i.e., under conditions satisfying the conditional Formulas (6) and (16)) while varying the number of times of ejection of droplets D per second (the "printing frequency" or "ejection frequency").

TABLE 1

| | | Dot Pitch (μm) | | | |
|---|---|---|---|---|---|
| | | 20 | 30 | 40 | 50 |
| Printing frequency (Hz) | 10 | Poor | Poor | Poor | Poor |
| | 1000 | Good | Good | Fair | Poor |
| | 10000 | Good | Good | Good | Poor |

In Table 1, if the line width w of the line image formed was stable (for example, if the amount of variation in the line width w (for instance, the difference between the maximum value and the minimum value of the line width per unit length) was less than a prescribed value), then "Good" is shown, if the amount of variation in the line width w was equal to or greater than a prescribed value, but not as large as in a case marked as "Poor", then "Fair" is shown, and if the amount of variation in the line width w was greater than the maximum value of the amount of variation in the case of "Fair", then "Poor" is shown. According to the experimental results shown in Table 1, when the printing frequency was 1000 Hz or above, the line width w was stable and results showing no bulges or jaggedness were obtained.

Therefore, the interval between deposition of the n-th droplet and deposition of the (n+1)-th droplet is set to be one millisecond or less. In so doing, it is possible to prevent mixing of portions in a state of equilibrium (a state where the droplets D have wet and spread, and the shapes of the droplets D are stable) and portions in a state of non-equilibrium (a state during wetting and spreading of droplets D, in which the shapes of the droplets have not yet been stabilized), on the substrate 12 during printing. As a result of this, a state of equilibrium is achieved, without the formation of a large mass of droplets D in a state of non-equilibrium which causes a portion of the pattern L to become thick, and therefore a line image of uniform width can be formed.

In the third embodiment, in addition to the conditions relating to the receding contact angle (not larger than 10°), it is even more desirable to satisfy the conditions relating to the ratio of the volatile component in the liquid (not less than the value expressed by Formula (16)), and the conditions relating to the printing frequency (not lower than 1 kHz).

<Examples of Application of Apparatus>

The line image forming apparatuses according to the embodiments described above can be applied in various apparatuses capable of forming a line-shape image pattern, such as an apparatus for forming wire images on an electronic circuit substrate, device manufacturing apparatuses of various kinds, a resist printing apparatus using a resin liquid as a functional liquid for ejection, a fine structure forming apparatus, and the like.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A line image forming method, comprising the steps of:

ejecting a plurality of droplets of liquid sequentially from an inkjet head, the liquid containing a functional component; and depositing the droplets of the liquid onto a non-permeable medium, the deposited droplets becoming joined together on the non-permeable medium to form a line pattern of the liquid, wherein a receding contact angle of the liquid with respect to the non-permeable medium being not larger than 10°, wherein the liquid is configured to be cured by irradiation of an activating light beam, wherein, in the ejecting step the inkjet head is controlled in such a manner that a subsequent droplet to be combined with an aggregate of a group of droplets having been previously deposited on the non-permeable medium is deposited onto the non-permeable medium before the aggregate of the group of previously deposited droplets reaches a state of equilibrium on the non-permeable medium, wherein the line image forming method further comprises the step of curing the liquid deposited on the non-permeable medium by irradiating the activating light beam onto the liquid on the non-permeable medium, and wherein in the curing step, a time T (s) from depositing of a last deposited droplet forming the line pattern until curing of the line pattern is controlled to satisfy:

$$T \leq \left(\frac{\pi}{6\theta}\right)^3,$$

where θ (rad) is a static contact angle of the liquid with respect to the non-permeable medium.

2. The line image forming method as defined in claim 1, wherein a static contact angle of the liquid with respect to the non-permeable medium is not smaller than 10°.

3. The line image forming method as defined in claim 1, wherein in the ejecting step, an ejection frequency of the inkjet head is not lower than 1 kHz.

4. The line image forming method as defined in claim 1, wherein the liquid contains volatile solvent.

5. The line image forming method as defined in claim 1, wherein in the depositing step, a dot pitch p (μm) of the deposited droplets which are adjacent to each other on the non-permeable medium is controlled to satisfy:

$$p \leq \frac{\pi d}{6\left(\frac{\theta}{\sin^2\theta} - \frac{\cos\theta}{\sin\theta}\right)\left\{\tan\frac{\theta}{2}\left(3 + \tan^2\frac{\theta}{2}\right)\right\}^{-\frac{2}{3}}},$$

where d (μm) is a droplet diameter obtained by spherical conversion of a volume of each of the droplets before being deposited on the non-permeable medium, and θ (rad) is a static contact angle of the liquid with respect to the non-permeable medium.

6. A line image forming apparatus, comprising:

an inkjet head which ejects a plurality of droplets of liquid containing a functional component;

a movement device which causes the inkjet head and a non-permeable medium to move relatively to each other, the droplets of the liquid ejected from the inkjet head being deposited onto the non-permeable medium; and a control device which controls the inkjet head and the movement device to form a line pattern of the liquid on the non-permeable medium by ejecting the droplets sequentially from the inkjet head and depositing the droplets onto the non-permeable medium, the deposited droplets having deposition time differences and becoming joined together on the non-permeable medium to form the line pattern of the liquid, wherein a receding contact angle of the liquid with respect to the non-permeable medium being not larger than 10°, wherein the liquid is configured to be cured by irradiation of an activating light beam, wherein the line image forming apparatus further comprises an activating light irradiation device which irradiates the activating light beam onto the liquid deposited on the non-permeable medium to cure the liquid on the non-permeable medium, wherein the control device controls the inkjet head in such a manner that a subsequent droplet to be combined with an aggregate of a group of droplets having been previously deposited on the non-permeable medium is deposited onto the non-permeable medium before the aggregate of the group of previously deposited droplets reaches a state of equilibrium on the non-permeable medium, and wherein the control device controls the activating light irradiation device in such a manner that a time T (s) from depositing of a last deposited droplet forming the line pattern until curing of the line pattern satisfies:

$$T \leq \left(\frac{\pi}{6\theta}\right)^3,$$

where θ (rad) is a static contact angle of the liquid with respect to the non-permeable medium.

7. The line image forming apparatus as defined in claim 6, wherein the control device controls the inkjet head in such a manner that a deposition time interval t (s) of the droplets adjacent to each other on the non-permeable medium satisfies:

$$t \leq \left(\frac{\pi}{6\theta}\right)^3 \times 0.001.$$

8. The line image forming apparatus as defined in claim 6, wherein:

the movement device includes a medium conveyance device which conveys the non-permeable medium in a medium conveyance direction at a uniform speed; and the activating light irradiation device is arranged on a downstream side of the inkjet head in terms of the medium conveyance direction.

9. The line image forming apparatus as defined in claim 6, wherein the activating light irradiation device is attached to the inkjet head, and the inkjet head and the activating light irradiation device are unitedly moved relatively with respect to the non-permeable medium.

10. The line image forming apparatus as defined in claim 6, wherein a static contact angle of the liquid with respect to the non-permeable medium is not smaller than 10°.

11. The line image forming apparatus as defined in claim 6, wherein the liquid contains volatile solvent.

12. The line image forming apparatus as defined in claim 6, wherein the control device controls the inkjet head to eject the droplets at an ejection frequency of not lower than 1 kHz.

13. The line image forming apparatus as defined in claim 6, wherein in the depositing step, a dot pitch p (μm) of the deposited droplets which are adjacent to each other on the non-permeable medium is controlled to satisfy:

$$p \leq \frac{\pi d}{6\left(\frac{\theta}{\sin^2\theta} - \frac{\cos\theta}{\sin\theta}\right)\left\{\tan\frac{\theta}{2}\left(3 + \tan^2\frac{\theta}{2}\right)\right\}^{-\frac{2}{3}}},$$

where d (μm) is a droplet diameter obtained by spherical conversion of a volume of each of the droplets before being deposited on the non-permeable medium, and θ (rad) is a static contact angle of the liquid with respect to the non-permeable medium.

14. A line image forming apparatus, comprising:

an inkjet head which ejects a plurality of droplets of liquid containing a functional component;

a movement device which causes the inkjet head and a non-permeable medium to move relatively to each other, the droplets of the liquid ejected from the inkjet head being deposited onto the non-permeable medium; and a control device which controls the inkjet head and the movement device to form a line pattern of the liquid on the non-permeable medium by ejecting the droplets sequentially from the inkjet head and depositing the droplets onto the non-permeable medium, the deposited droplets having deposition time differences and becoming joined together on the non-permeable medium to form the line pattern of the liquid, wherein a receding contact angle of the liquid with respect to the non-permeable medium being not larger than 10°, wherein a dot pitch p (μm) of the deposited droplets which are adjacent to each other on the non-permeable medium is controlled to satisfy:

$$p \leq \frac{\pi d}{6\left(\frac{\theta}{\sin^2\theta} - \frac{\cos\theta}{\sin\theta}\right)\left\{\tan\frac{\theta}{2}\left(3 + \tan^2\frac{\theta}{2}\right)\right\}^{-\frac{2}{3}}},$$

where d (μm) is a droplet diameter obtained by spherical conversion of a volume of each of the droplets before being deposited on the non-permeable medium, and θ (rad) is a static contact angle of the liquid with respect to the non-permeable medium, and wherein the control device controls the inkjet head in such a manner that a deposition time interval t (s) of the droplets adjacent to each other on the non-permeable medium satisfies:

$$t \leq \left(\frac{\pi}{6\theta}\right)^3 \times 0.001.$$

* * * * *